United States Patent
Sasaki et al.

(10) Patent No.: US 9,330,473 B2
(45) Date of Patent: May 3, 2016

(54) IMAGE PROCESSING APPARATUS, AND NON-TRANSITORY COMPUTER READABLE MEDIUM

(71) Applicant: FUJI XEROX CO., LTD., Tokyo (JP)

(72) Inventors: Makoto Sasaki, Tokyo (JP); Shota Narumi, Tokyo (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/519,634

(22) Filed: Oct. 21, 2014

(65) Prior Publication Data

US 2015/0348238 A1 Dec. 3, 2015

(30) Foreign Application Priority Data

May 28, 2014 (JP) .................................. 2014-110616

(51) Int. Cl.
| | | |
|---|---|---|
| G06K 9/00 | (2006.01) |
| G06T 7/40 | (2006.01) |
| G06K 9/46 | (2006.01) |
| G06T 5/00 | (2006.01) |
| G06T 5/40 | (2006.01) |
| H04N 1/60 | (2006.01) |

(52) U.S. Cl.
CPC .............. *G06T 7/408* (2013.01); *G06K 9/4652* (2013.01); *G06K 9/4661* (2013.01); *G06T 5/008* (2013.01); *G06T 5/40* (2013.01); *H04N 1/6058* (2013.01); *G06T 2207/10024* (2013.01); *G06T 2207/20208* (2013.01)

(58) Field of Classification Search
None
See application file for complete search history.

(56) References Cited

U.S. PATENT DOCUMENTS

| | | | | |
|---|---|---|---|---|
| 5,539,541 A * | 7/1996 | Ushida | ................ | H04N 1/4092 358/448 |
| 6,560,358 B1 * | 5/2003 | Tsukada | ............... | H04N 1/6088 358/1.9 |
| 7,010,160 B1 * | 3/2006 | Yoshida | ................ | H04N 5/243 348/362 |
| 7,127,122 B2 * | 10/2006 | Ogata | .................... | G06T 5/002 382/260 |
| 7,570,833 B2 * | 8/2009 | Lee | ........................... | G06T 5/20 348/216.1 |
| 7,916,936 B2 * | 3/2011 | Kondo | ..................... | G06K 9/40 348/241 |
| 8,320,701 B2 * | 11/2012 | Ohwaki | ................ | G06T 5/004 345/20 |
| 8,538,145 B2 * | 9/2013 | Finlayson | .............. | G06T 5/007 382/167 |
| 2005/0089239 A1 * | 4/2005 | Brajovic | .................. | G06T 5/50 382/266 |
| 2007/0047835 A1 | 3/2007 | Kondo | | |
| 2008/0226191 A1 * | 9/2008 | Ohwaki | ................ | G06T 5/004 382/264 |

FOREIGN PATENT DOCUMENTS

| | | |
|---|---|---|
| JP | 2007-067746 A | 3/2007 |
| JP | 2008-236072 A | 10/2008 |
| JP | 2013-210709 A | 10/2013 |

* cited by examiner

*Primary Examiner* — Andrae S Allison
(74) *Attorney, Agent, or Firm* — Oliff PLC

(57) ABSTRACT

Provided is an image processing apparatus including a color conversion unit that performs color conversion to convert an original image to a luminance image and to a chromaticity image, an illumination image generation unit that generates an illumination image having an illumination component of the luminance image as a pixel value from the luminance image, a reflectance image generation unit that generates a reflectance image having a stabilized reflectance component of the luminance image as a pixel value, a luminance reproduction image generation unit that enhances the reflectance component of the luminance image to generate a luminance reproduction image reproduced with being improved visibility of the luminance image, and an inverse color conversion unit that performs conversion inverse to the color conversion performed by the color conversion unit on the luminance reproduction image and the chromaticity image.

19 Claims, 27 Drawing Sheets

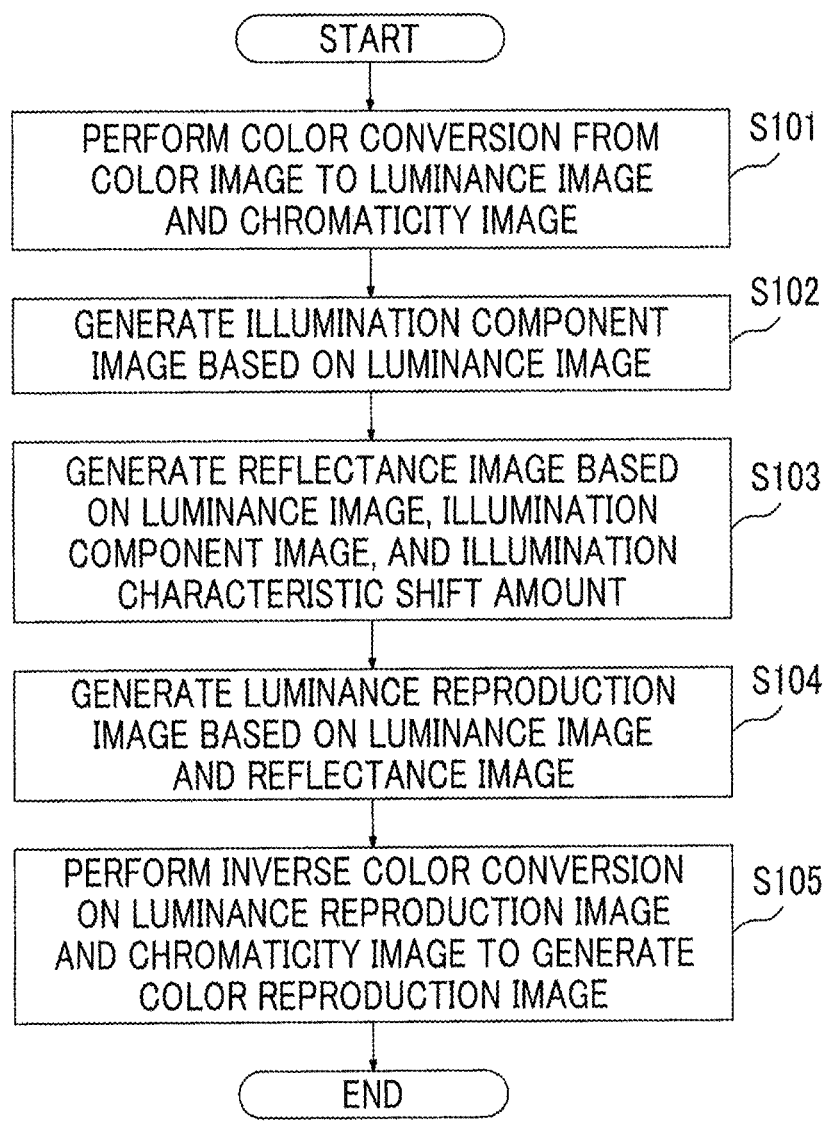

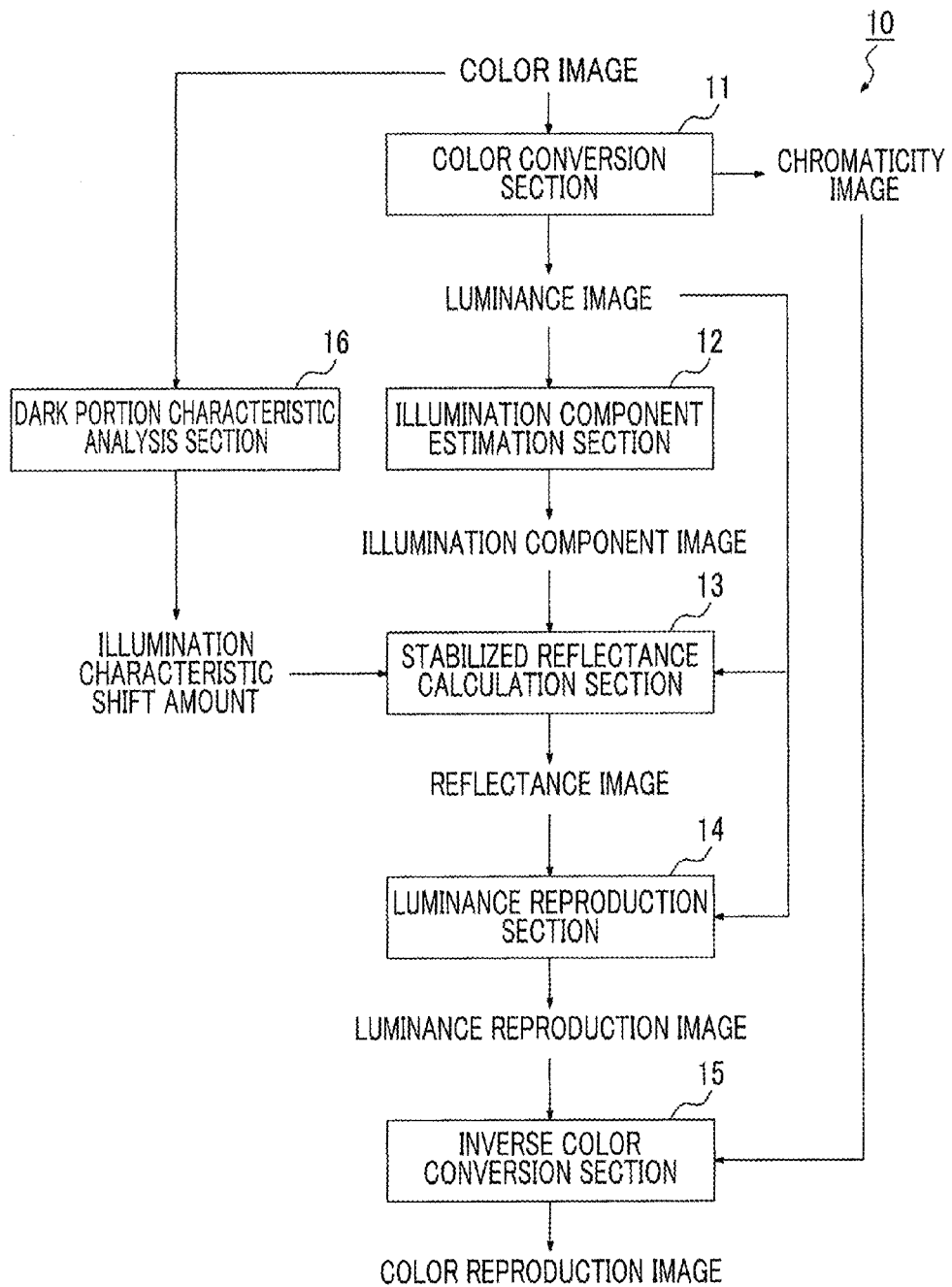

SCENE IMAGE

EXHIBITION IMAGE

SCENE IMAGE

EXHIBITION IMAGE

SCENE IMAGE

EXHIBITION IMAGE

ENLARGEMENT OF TREE LEAF REGION
(SCENE IMAGE)

ENLARGEMENT OF WALL REGION
(EXHIBITION IMAGE)

SCENE IMAGE

EXHIBITION IMAGE

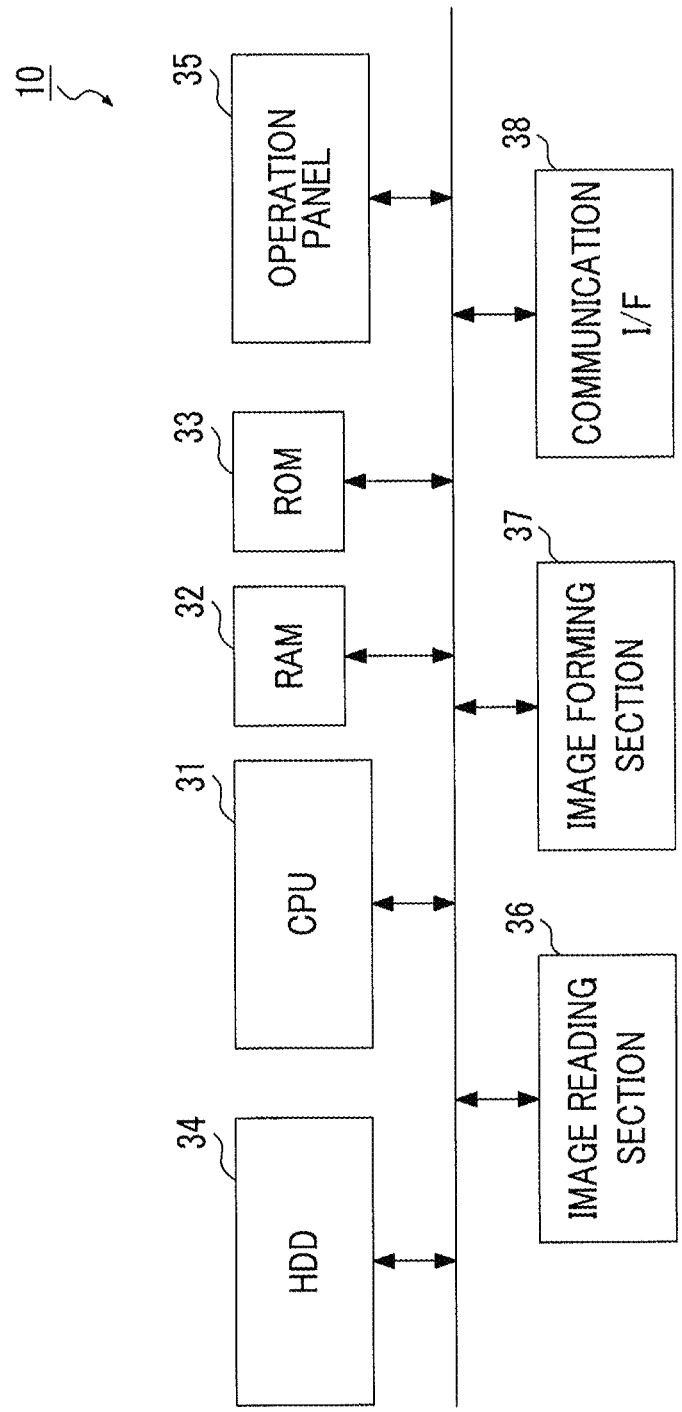

ial Field

The present invention relates to an image processing apparatus, and a non-transitory computer readable medium.

SUMMARY

According to an aspect of the invention, there is provided an image processing apparatus including:

a color conversion unit that performs color conversion to convert an original image to a luminance image having a luminance component of the original image as a pixel value and to a chromaticity image having a chromaticity component of the original image as a pixel value;

an illumination image generation unit that generates an illumination image having an illumination component of the luminance image as a pixel value from the luminance image;

a reflectance image generation unit that generates a reflectance image having a stabilized reflectance component of the luminance image as a pixel value based on the luminance image, the illumination image, change degree information representing a degree of change of the pixel value of the illumination image;

a luminance reproduction image generation unit that enhances the reflectance component of the luminance image based on the luminance image and the reflectance image to generate a luminance reproduction image reproduced with being improved visibility of the luminance image; and an inverse color conversion unit that performs conversion inverse to the color conversion performed by the color conversion unit on the luminance reproduction image and the chromaticity image.

BRIEF DESCRIPTION OF THE DRAWINGS

Exemplary embodiments of the present invention will be described in detail based on the following figures, wherein:

FIG. 6 is a flowchart showing an operation example of the image processing apparatus in the first exemplary embodiment of the invention;

FIG. 7 is a block diagram showing a functional configuration example of an image processing apparatus in a second exemplary embodiment of the invention;

FIG. 27 is a block diagram showing a hardware configuration example of an image processing apparatus in an exemplary embodiment of the invention.

DETAILED DESCRIPTION

Hereinafter, exemplary embodiments of the invention will be described in detail referring to the accompanying drawings.

Background of the Invention

In recent years, there are an increasing number of users who carries an information and communication technology (ICT) device, and photographing or image browsing is often performed at various locations. The ICT device has an advantage of performing image browsing conveniently regardless of locations, but has a disadvantage of being largely influenced by a carried place, such as change in ambient light. From this, in a recent monitor environment, while there are "convenience for use" and "various locations of use" as opposed to a monitor environment in the related art, "visibility" of whether or not an image is easily viewed has been emphasized.

The term "visibility" is a characteristic regarding whether or not a visual target may be viewed clearly. As a method of improving visibility of an image, gamma correction, histogram equalization, and the like are used. In the gamma correction, a curve that enhances a dark portion or a target region is generated and applied to a pixel value, whereby a dark portion is brightened. In the histogram equalization, a curve that removes eccentricity of the histogram of an image is generated and applied to a pixel value, whereby reproduction in which a histogram is smoothed is performed.

As a method of improving visibility using a human visual cognition characteristic, a method using the retinex principle is also used. Reproduction based on the retinex principle applies the psychophysical finding that human cognition of a scene largely depends on reflectance of an object. Specifically, in image reproduction processing by a retinex model, a pixel value is decomposed into an illumination component and a reflectance component, and the reflectance component is enhanced, thereby improving visibility.

In this way, the reproduction based on the retinex principle improves visibility of the image. However, there is a problem in that dark portion noise is enhanced.

In regard to this problem, in the related art, a countermeasure against noise to be generated is considered. Meanwhile, in this exemplary embodiment, a countermeasure against the retinex model calculation principle is considered. In the retinex principle, there is a portion where calculation becomes unstable, and accordingly, noise is generated. This exemplary embodiment suppresses noise and stabilizes image quality when performing reproduction to improve visibility.

First Exemplary Embodiment

Figure 1:
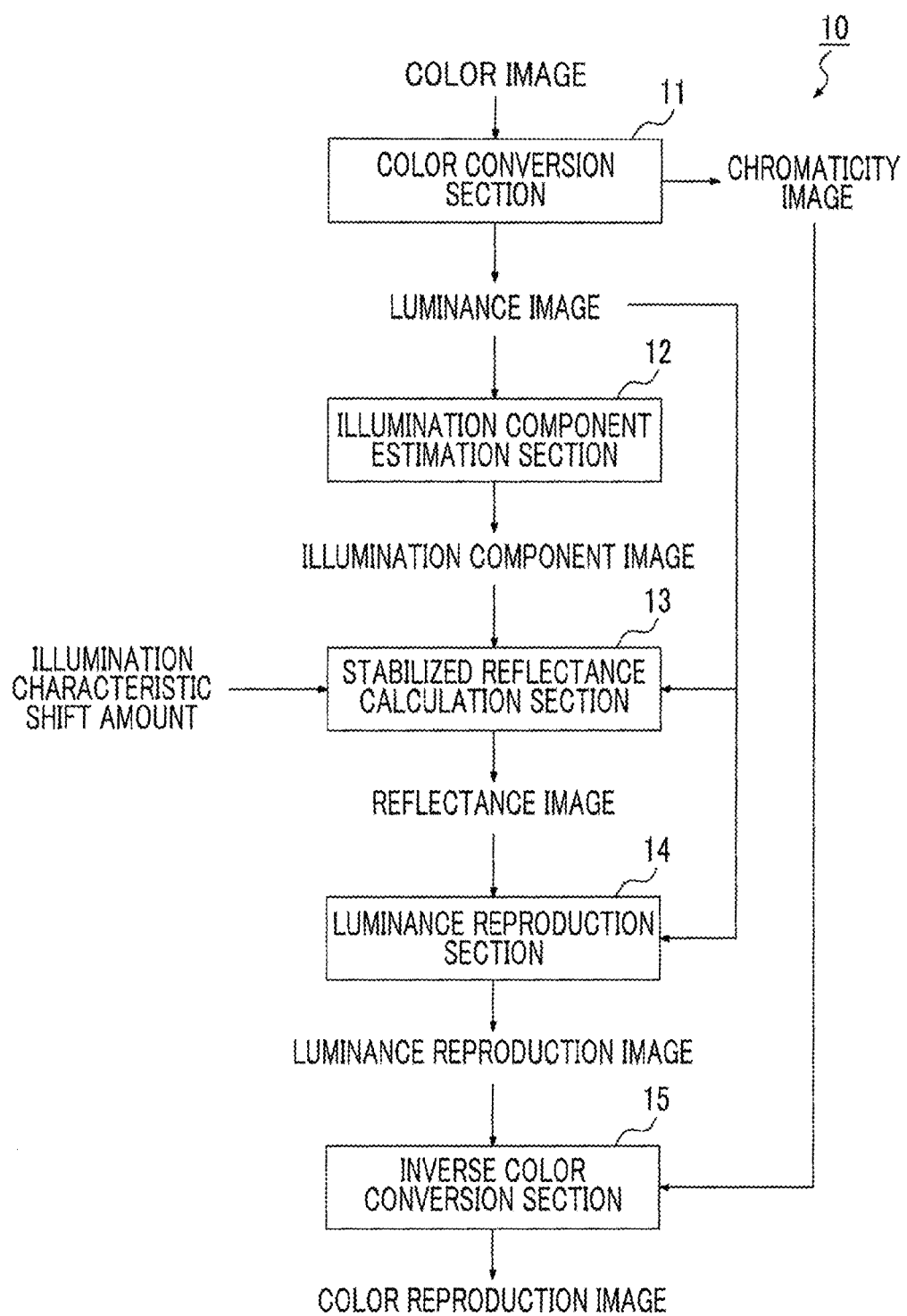
FIG. 1 is a block diagram showing a functional configuration example of an image processing apparatus in a first exemplary embodiment of the invention.

FIG. 1 is a block diagram showing a functional configuration example of an image processing apparatus 10 in a first exemplary embodiment of the invention. As shown in the drawing, the image processing apparatus 10 in the first exemplary embodiment includes a color conversion section 11, an illumination component estimation section 12, a stabilized reflectance calculation section 13, a luminance reproduction section 14, and an inverse color conversion section 15.

The color conversion section 11 separates a color image to be an original image into a luminance image having a luminance component as a pixel value and a chromaticity image with a chromaticity component as a pixel value. The color image is generally an image represented by color components, such as RGB or CYMK. As the luminance image and the chromaticity image, an image represented by HSV, L*a*b*, YCbCr, or the like is used. In this exemplary embodiment, description will be provided assuming that the luminance image and the chromaticity image are an HSV image. In this way, if the luminance image and the chromaticity image are an HSV image, the color conversion section 11 generates a V image as a luminance image and generates an H (hue) S (saturation) image as a chromaticity image.

In this exemplary embodiment, the color conversion section 11 is provided as an example of a color conversion unit that performs color conversion to convert an original image to a luminance image and a chromaticity image.

Here, if a pixel value for the position (x,y) of the V image is I(x,y), in a retinex model, as described below, I(x,y) is divided into an illumination component L(x,y) and a reflectance component R(x,y).

$$I(x,y)=R(x,y)L(x,y) \quad \text{(Expression 1)}$$

As in Expression 1, a problem to separate one value into two values is generally called an ill-posed problem. If one of the illumination component and the reflectance component is not estimated using any method, it is not possible to find the other component.

Accordingly, the illumination component estimation section 12 estimates L(x,y) based on I(x,y) generated by the color conversion section 11. As one characteristic of visual cognition, it is known that the amount of cognition of one point (in an image, one pixel) of light entering a retina has an influence on the average of peripheral luminance of one point. Peripheral luminance corresponds to the estimated illumination component, and an illumination estimation model becomes the convolution of the following function.

$$G(x, y) = k\exp\left(-\frac{x^2 + y^2}{\sigma^2}\right) \quad \text{(Expression 2)}$$

Here, k represents a coefficient for normalization such that the result of integration with pixels of the filter size of image processing becomes 1. Further, σ represents a smoothing degree (scale), and when σ is large, a convolution image with strong blur is obtained. Note that the above-described function is an example, and any filter may be used insofar as an image is smoothed consequently. For example, there is a bilateral filter that is a filter by a modified function of Expression 1 and is known as a smoothing filter that performs edge preservation, and the bilateral filter may be used.

According to the retinex principle, it is known that a human visual characteristic estimates illumination light from the periphery of a region of interest. Accordingly, a smoothed image represents estimated illumination light. However, since a suitable scale is different depending on a scene, for example, it is preferable that, in the estimation of illumination light, a weighted sum of images of N layers from a scale 1 to a scale N is taken.

$$L(x, y) = \sum_{n=1}^{N} W_n G_n(x, y) \otimes I(x, y)$$ (Expression 3)

Here, L(x,y) represents an illumination component to be estimated, $G_n$(x,y) represents Expression 2 for the scale n, I(x,y) represents a pixel value of a luminance image, $W_n$ represents a weight for the scale n, and a symbol with "x" surrounded by "○" represents convolution. Note that $W_n$ may be simply 1/N or may be variable according to the layer. Then, an image having the thus-calculated L(x,y) as a pixel value is referred to as an illumination component image.

In this exemplary embodiment, an illumination component image is used as an example of an illumination image having an illumination component of a luminance image as a pixel value, and the illumination component estimation section 12 is provided as an example of an illumination image generation unit that generates an illumination image.

On the other hand, according to Expression 1, reflectance is calculated based on the estimated illumination component as follows.

$$R(x, y) = \frac{I(x, y)}{L(x, y)}$$ (Expression 4)

Figure 2:
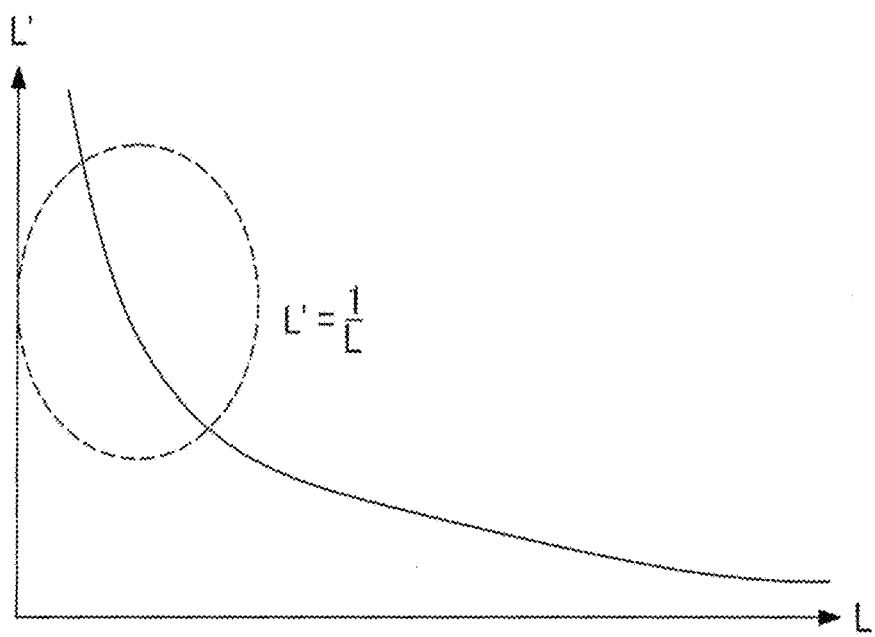
FIG. 2 is a graph showing change of the reciprocal of $L(x,y)$ with change of $L(x,y)$.

As will be understood from Expression 4, R(x,y) is found by calculation using the reciprocal of L(x,y). Accordingly, when L(x,y) is L and the reciprocal of L(x,y) is L', change of L' with change of L is considered. FIG. 2 shows a graph of "L'=1/L". As encircled by a broken line in FIG. 2, in a region where L is small, that is, in a region where the value of the illumination component is small (a region where peripheral luminance is low), L' changes largely with small change of L. If the pixel value I(x,y) is 0 or a value close to 0, calculation may be performed properly such that Expression 4 becomes 0. However, when both of I(x,y) and L(x,y) are small and 1/L diverges, calculation of reflectance fails.

Accordingly, the stabilized reflectance calculation section 13 calculates reflectance by an illumination characteristic shift amount for calculating stabilized reflectance. Specifically, as described above, stabilized reflectance $R_s$ is calculated using the illumination characteristic shift amount Lo, in addition to the luminance image I(x,y) generated by the color conversion section 11 and the illumination component image L(x,y) generated by the illumination component estimation section 12.

$$R(x, y) = \frac{I(x, y)}{L(x, y) + L_o}$$ (Expression 5)

Here, Lo is a parameter that is variable according to the characteristic of an image. An image having the stabilized reflectance $R_s$ as a pixel value is a reflectance image.

Figure 3:
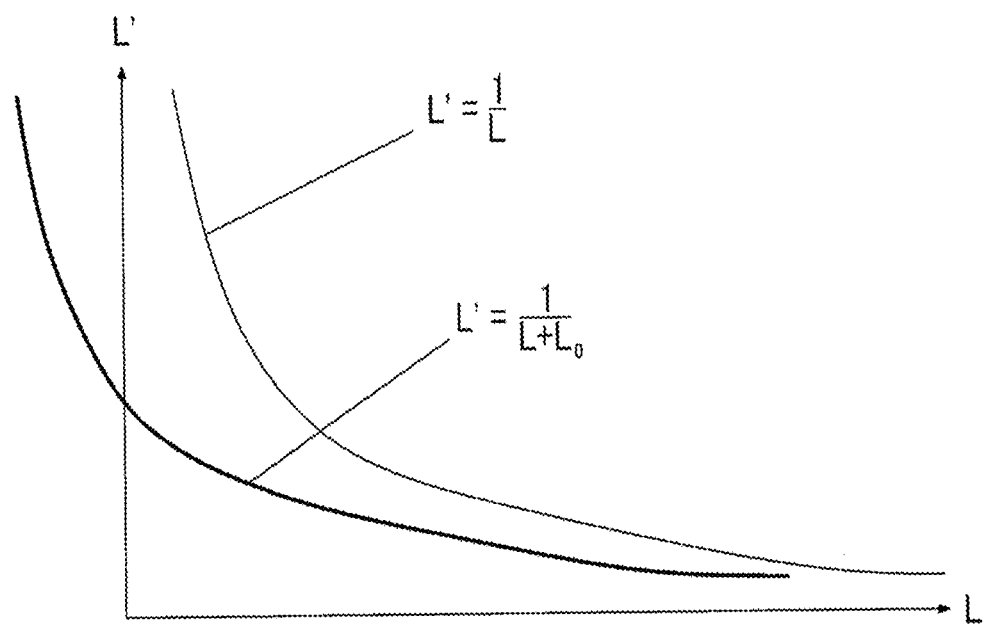
FIG. 3 is a graph showing change of the reciprocal of $(L(x,y)+Lo)$ with change of $L(x,y)$ in comparison to change of the reciprocal of $L(x,y)$.

In Expression 5, when L(x,y) is L and the reciprocal of (L(x,y)+Lo) is L', change of L' with change of L is considered. FIG. 3 shows a graph of "L'=1/(L+Lo)" in comparison to a graph of "L'=1/L". As will be understood from FIG. 3, the illumination characteristic shift amount Lo is used, the graph of "L'=1/(L+Lo)" is obtained by shifting the graph of "L'=1/L" to the left. With this, in a region where L is small, there is no case where L' changes largely with small change of L.

In this exemplary embodiment, the illumination characteristic shift amount is used as an example of change degree information representing the degree of change of the pixel value of the illumination image, and the stabilized reflectance calculation section 13 is provided as an example of a reflectance image generation unit that generates a reflectance image based on the luminance image, the illumination image, and the change degree information.

The luminance reproduction section 14 enhances the stabilized reflectance $R_s$ calculated by the stabilized reflectance calculation section 13 to generate a luminance reproduction image that is a reproduction image with improved visibility of the luminance image generated by the color conversion section 11.

In general, for example, the pixel value Iˆ(x,y) of the luminance reproduction image is found by the following expression. Note that, in this specification, a hat symbol is attached directly above a character in the expression, but is attached after a character in the text.

$$\hat{I}(x,y) = \alpha R(x,y) + (1-\alpha)I(x,y)$$ (Expression 6)

Here, α is a parameter representing the degree of enhancement of reflectance, and is in a range of 0≤α≤1. Iˆ(x,y) represents the pixel value of the luminance image when α=0, and represents the pixel value of the reflectance image when α=1.

Meanwhile, a reproduction expression by the stabilized reflectance $R_s$(x,y) of this exemplary embodiment should be as follows.

$$\hat{I}(x,y) = \alpha R_s(x,y) + (1-\alpha)I(x,y)$$ (Expression 7)

Figure 4:
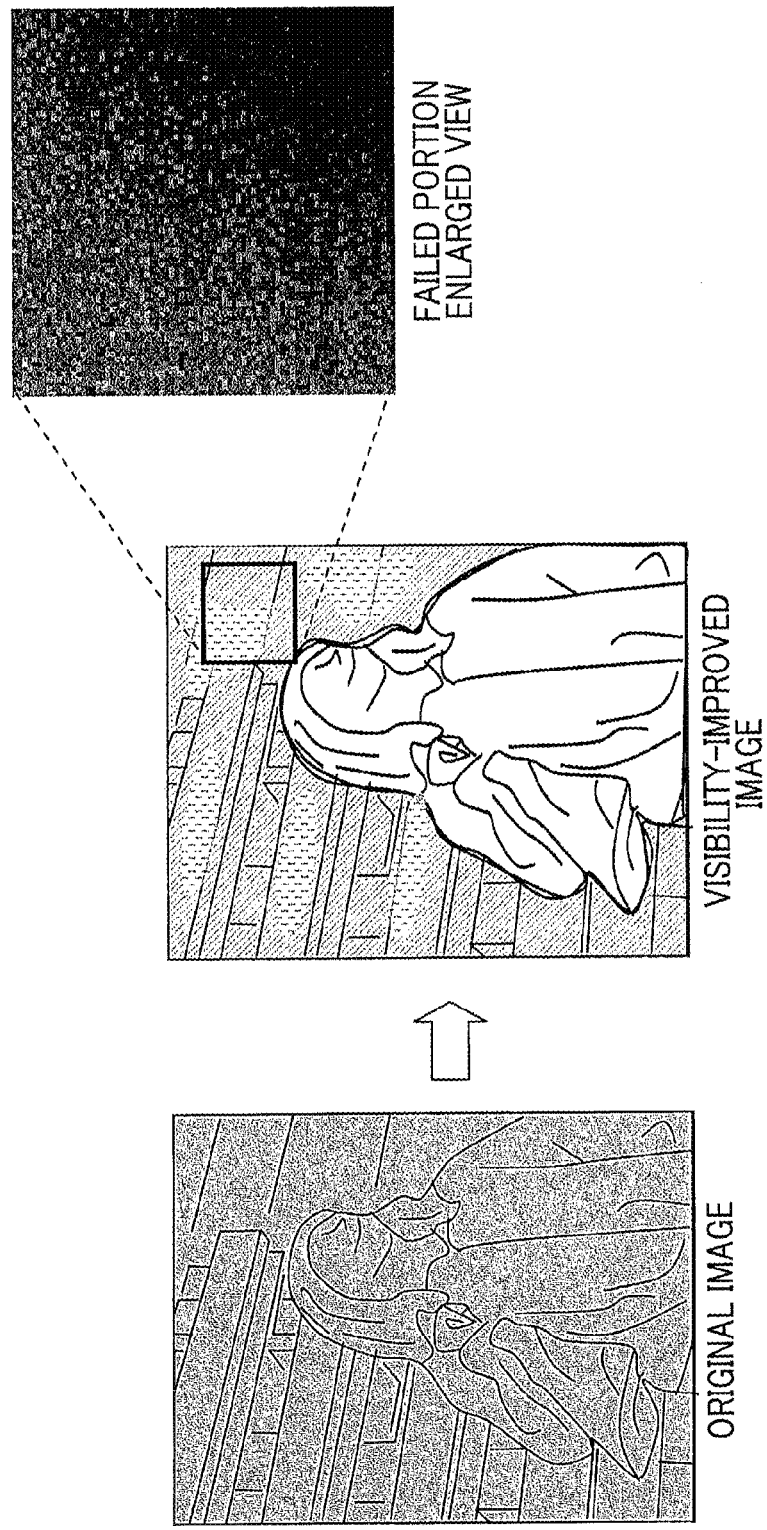
FIG. 4 is a diagram showing a visibility-improved image reproduced based on an original image when reflectance is unstable and a dark portion region of the visibility-improved image.
Figure 5:
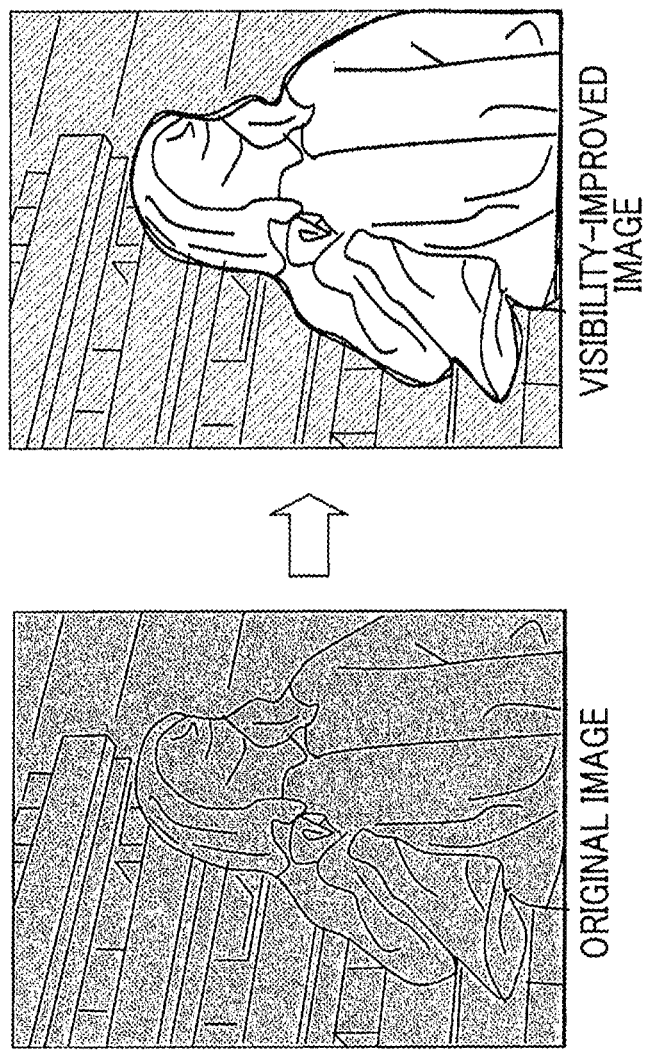
FIG. 5 is a diagram showing a visibility-improved image reproduced based on an original image when reflectance is stable.

For example, if reproduction improving visibility by Expression 6 is performed, there is a case where the dark portion region is as shown in a failed portion enlarged view of FIG. 4 by the influence of unstable reflectance. That is, unstable calculation causes noise of the dark portion. Meanwhile, according to this exemplary embodiment, if the calculation of the reciprocal is stable, reflectance is stabilized, whereby, as shown in FIG. 5, the influence of dark portion noise is suppressed.

In this exemplary embodiment, the luminance reproduction section 14 is provided as an example of a luminance reproduction image generation unit that generates a luminance reproduction image.

If the luminance reproduction image with improved visibility is generated, the inverse color conversion section 15 performs color conversion inverse to the color conversion section 11 on the luminance reproduction image and the chromaticity image generated by the color conversion section 11. That is, a reproduction image of an HSV color space obtained by a sequence of processing of the first exemplary embodiment is converted to a reproduction image of an RGB color space to obtain a color reproduction image to be a final reproduction image.

In this exemplary embodiment, the inverse color conversion section 15 is provided as an example of an inverse color conversion unit that performs conversion inverse to the color conversion performed by the color conversion unit.

FIG. 6 is a flowchart showing an operation example of the image processing apparatus 10 in the first exemplary embodiment of the invention.

If a color image is input, first, the color conversion section 11 performs color conversion on the color image from the color space of the color image to the color space of luminance and chromaticity to generate a luminance image and a chromaticity image (Step 101).

Next, the illumination component estimation section 12 generates an illumination component image based on the luminance image generated in Step 101 by Expression 3 (Step 102). Next, the stabilized reflectance calculation section 13 generates a reflectance image based on the luminance image generated in Step 101, the illumination component image generated in Step 102, and a predefined illumination characteristic shift amount Lo by Expression 5 (Step 103). Thereafter, the luminance reproduction section 14 generates a luminance reproduction image based on the luminance image generated in Step 101 and the reflectance image generated in Step 103 by Expression 7 (Step 104).

Finally, the inverse color conversion section 15 performs color conversion inverse to the color conversion performed by the color conversion section 11 on the luminance reproduction image generated in Step 104 and the chromaticity image generated in Step 101, that is, color conversion from the color space of luminance and chromaticity to the color space of the color image to generate a color reproduction image (Step 105).

Second Exemplary Embodiment

FIG. 7 is a block diagram showing a functional configuration example of the image processing apparatus 10 in a second exemplary embodiment of the invention. As shown in the drawing, the image processing apparatus 10 in the second exemplary embodiment includes the color conversion section 11, the illumination component estimation section 12, the stabilized reflectance calculation section 13, the luminance reproduction section 14, the inverse color conversion section 15, and a dark portion characteristic analysis section 16. Here, the color conversion section 11, the illumination component estimation section 12, the stabilized reflectance calculation section 13, the luminance reproduction section 14, and the inverse color conversion section 15 are the same as those in the first exemplary embodiment, and description thereof will not be repeated. Hereinafter, only the dark portion characteristic analysis section 16 will be described.

The dark portion characteristic analysis section 16 calculates an illumination characteristic shift amount Lo according to an image from a dark portion characteristic of a color image.

Figure 8A:
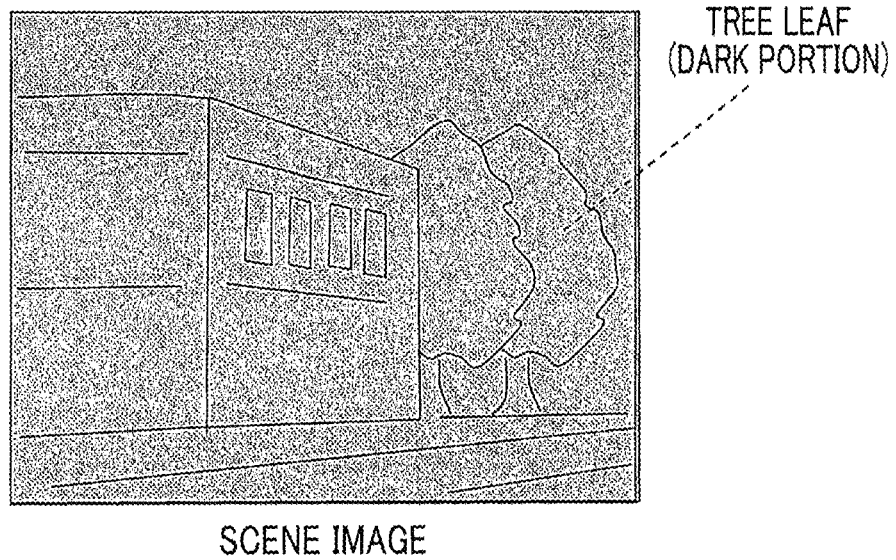
FIG. 8A is a diagram showing an example of a scene image with poor visibility.
Figure 8B:
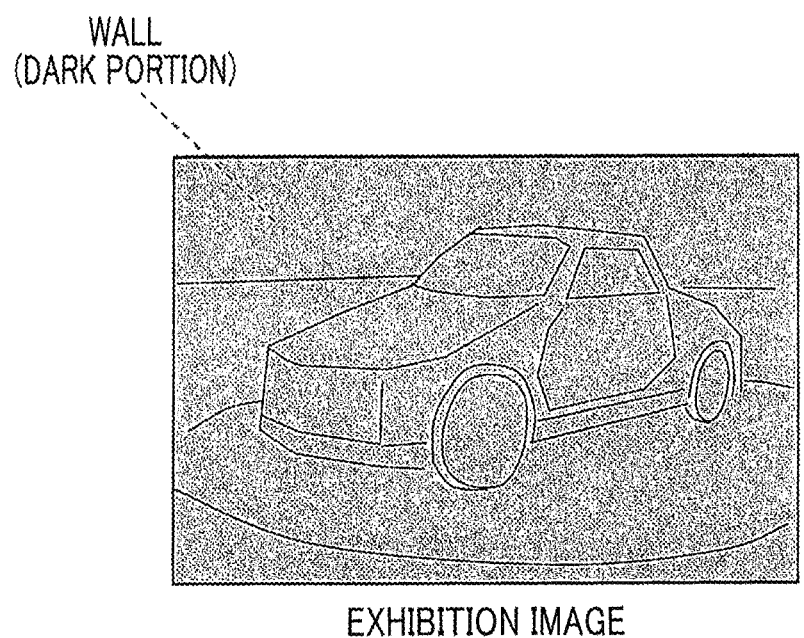
FIG. 8B is a diagram showing an example of an exhibition image with poor visibility.

There is a case where it is preferable to change the illumination characteristic shift amount Lo depending on images. FIG. 8A shows an example of a scene image with poor visibility, and FIG. 8B shows an example of an exhibition image with poor visibility. It is assumed that, in the scene image of FIG. 8A, in particular, a portion of tree leaves is a dark portion, and in the exhibition image of FIG. 8B, in particular, a portion of a wall is a dark portion. In an image with poor visibility, when a uniform region, such as a wall, is a dark portion and when a region where texture, such as tree leaves, is present is a dark portion, the dark portion is hardly viewed.

Figure 9A:
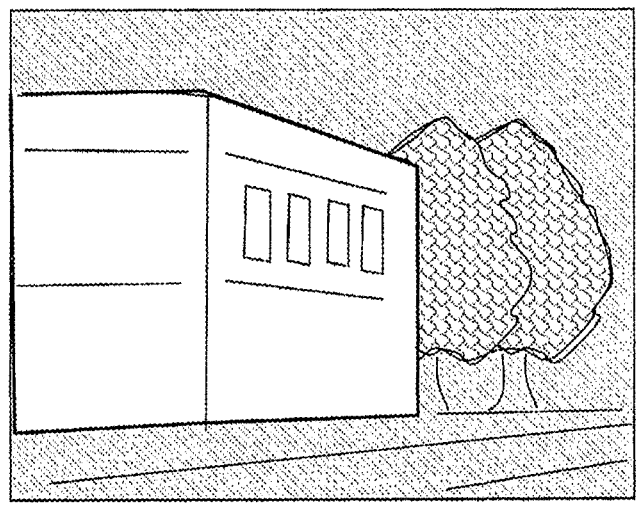
FIG. 9A is a diagram showing an example of a scene image with improved visibility by an illumination characteristic shift amount suitable for a scene image.
Figure 9B:
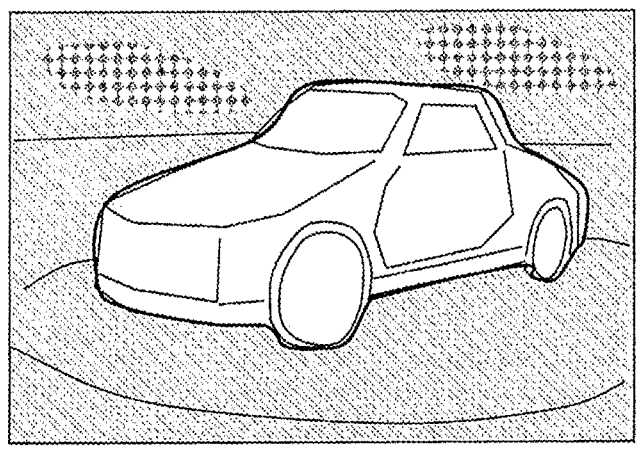
FIG. 9B is a diagram showing an example of an exhibition image with dark portion noise by an illumination characteristic shift amount suitable for a scene image.
Figure 10A:
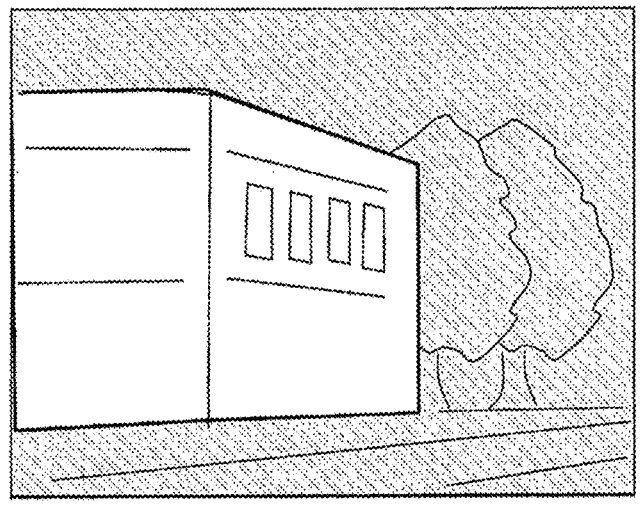
FIG. 10A is a diagram showing an example of a scene image without improved visibility by an illumination characteristic shift amount suitable for an exhibition image.
Figure 10B:
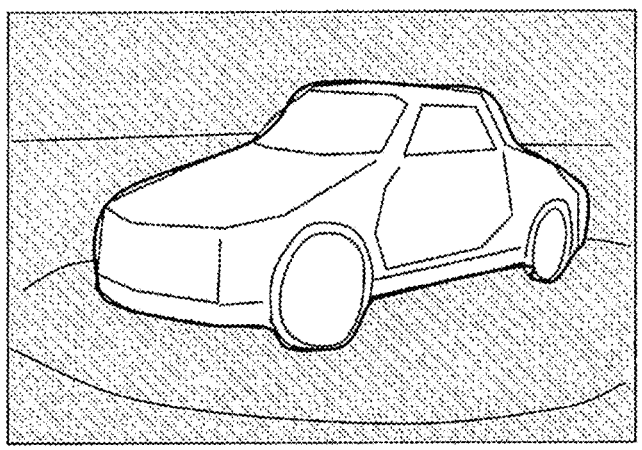
FIG. 10B is a diagram showing an example of an exhibition image with improved visibility by an illumination characteristic shift amount suitable for an exhibition image.

In this case, it is assumed that, in regard to the scene image of FIG. 8A and the exhibition image of FIG. 8B, reproduction improving visibility using the same illumination characteristic shift amount Lo is performed. Then, for example, as shown in FIG. 9A, in a scene image that is improved in visibility even if the illumination characteristic shift amount Lo becomes close to 0, the tree leaves are viewed clearly. On the other hand, as shown in FIG. 9B, in the wall of the exhibition image, dark portion noise is increased. As shown in FIG. 10B, it is assumed that the illumination characteristic shift amount Lo matches a value such that dark portion noise is not generated in the exhibition image. In this case, as shown in FIG. 10A, there is a problem in that tree leaves are not easily viewed in the scene image. That is, there is a case where it is not possible to remove dark portion noise of both images with the same illumination characteristic shift amount Lo.

Figure 11A:
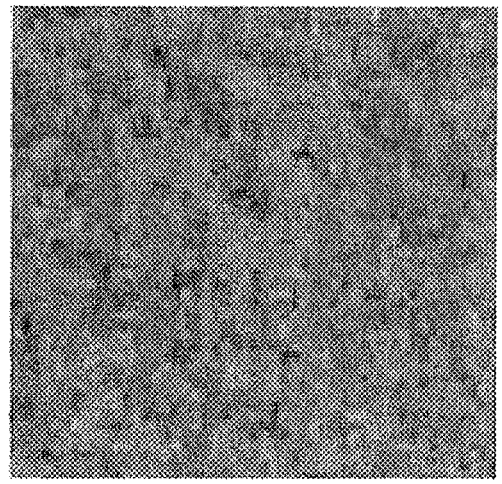
FIG. 11A is a diagram showing an example of an image with large variation in color.
Figure 11B:
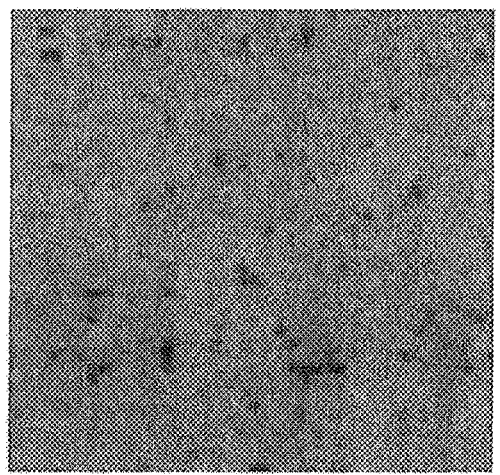
FIG. 11B is a diagram showing an example of an image with small variation in color.

This is considered because, in the same dark portion region, there is a difference in the characteristic of the way of variation in color between a texture region, such as tree leaves, shown in FIG. 11A and a region, such as a wall, shown in FIG. 11B. That is, while both regions are dark portions, the range of variation in color, the degree of variation, or the like is different apparently. Note that FIGS. 11A and 11B are diagrams showing a dark portion region, and for ease of understanding of the characteristic, brightness increases.

Accordingly, the dark portion characteristic analysis section 16 calculates the illumination characteristic shift amount Lo according to the characteristics shown in FIGS. 11A and 11B. For example, FIG. 11A shows a region where there is texture in the dark portion with no noise, and in the region, the RGB value varies in a range of 0 to about 30. FIG. 11B shows a region where noise is amplified apparently if retinex enhancement is performed, that is, a region where variation of pixels is not desired intrinsically even if reproduction improving visibility is performed, and in the region, the RGB value varies in a range of 0 to about 15.

Hereinafter, an analysis example of the color image by the dark portion characteristic analysis section 16 will be described.

First, the dark portion characteristic analysis section 16 extracts a pixel which satisfies the following expression.

$$\theta_{RGB} > R, G, B \quad \text{(Expression 8)}$$

Here, $\theta_{RGB}$ is a threshold value of an RGB value that is regarded as a dark portion.

Next, the dark portion characteristic analysis section 16 calculates the dispersions of the R value, the G value, and the B value and finds the average value $\sigma^2_{RGB}$ of the dispersions.

$$\sigma^2_{RGB} = \frac{1}{3}\left(\frac{1}{N}\sum_i (R_i - \overline{R})^2 + \frac{1}{N}\sum_i (G_i - \overline{G})^2 + \frac{1}{N}\sum_i (B_i - \overline{B})^2\right) \quad \text{(Expression 9)}$$

Here, N is the number of pixels included in a dark portion satisfying Expression 8. The degree of variation of the pixel value with the $\sigma^2_{RGB}$ found in Expression 9 as a criterion in the dark portion is understood. As shown in the examples of FIGS. 11A and 11B, if the value is small, it is considered to be a region, such as a wall, and there is an increasing possibility that noise is conspicuous after reproduction improving visibility is performed. To the contrary, if the value is large, it is considered to be texture, such as tree leaves.

Figure 12:
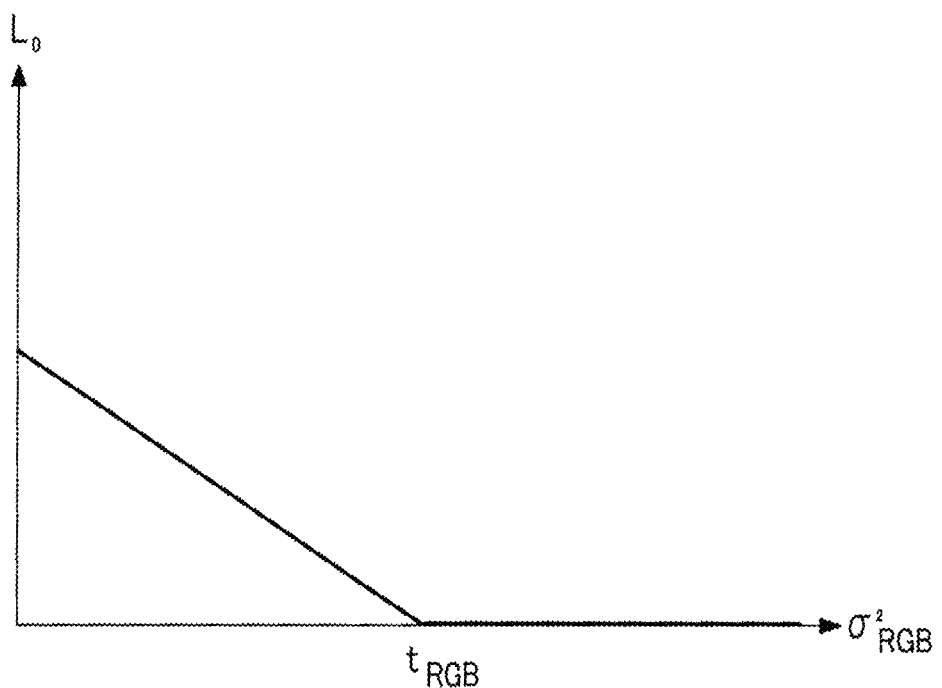
FIG. 12 is a diagram showing an example of a function in which an average value of dispersion of RGB is associated with an illumination characteristic shift amount.
Figure 13A:
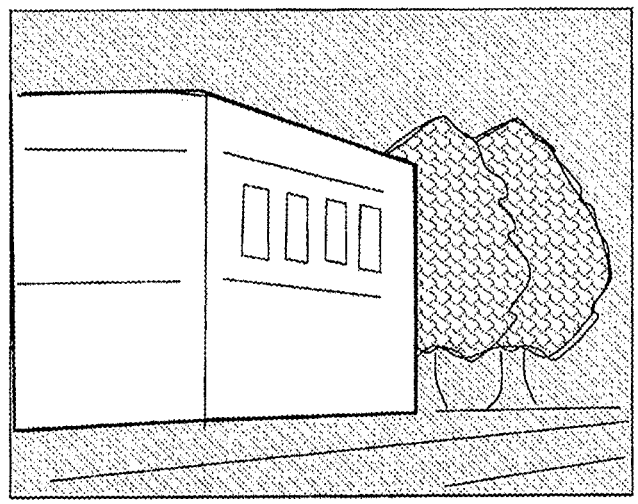
FIG. 13A is a diagram showing an example of a scene image with improved visibility.
Figure 13B:
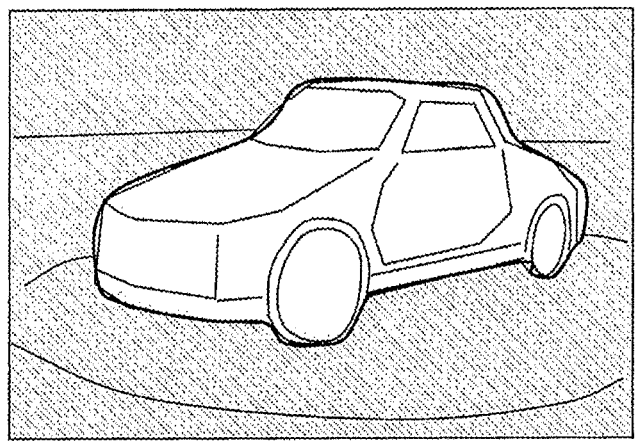
FIG. 13B is a diagram showing an example of an exhibition image with improved visibility.

When $\sigma^2_{RGB}$ is small, in order to secure calculation stability, it is preferable to increase the illumination characteristic shift amount Lo. When $\sigma^2_{RGB}$ increases, the illumination characteristic shift amount Lo should decrease. Accordingly, for example, as shown in FIG. 12, $\sigma^2_{RGB}$ and Lo should be associated with each other. Here, a value of $t_{RGB}$ in FIG. 12 should be determined in advance from a statistical value of a region regarded to be a wall or a region to be texture. In this way, the illumination characteristic shift amount Lo determined according to a scene is used, whereby, as shown in FIGS. 13A and 13B, satisfactory visibility is secured for any images.

Figure 14:
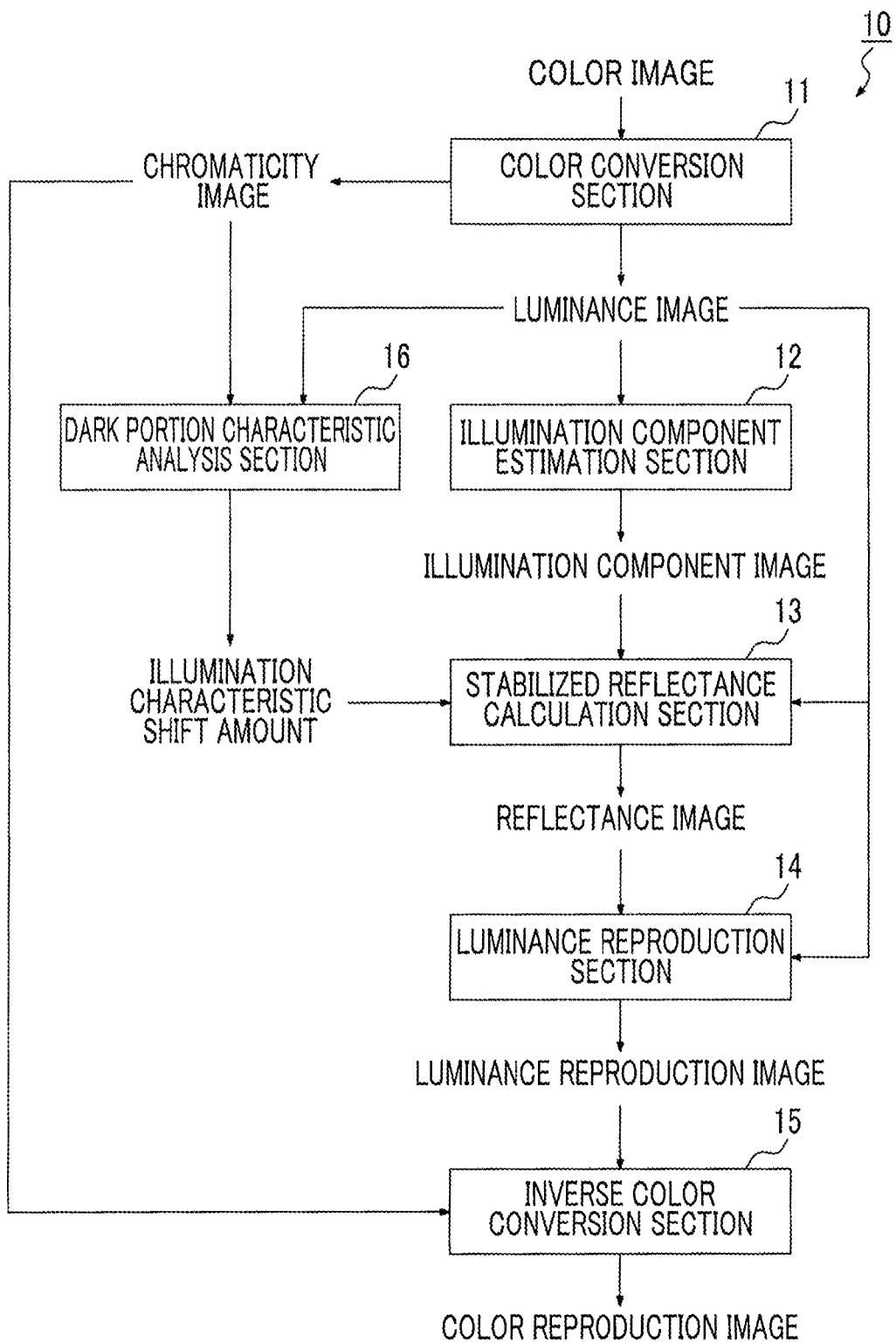
FIG. 14 is a block diagram showing a functional configuration example of an image processing apparatus in a modification example of the second exemplary embodiment of the invention.

On the other hand, although a case where the dark portion characteristic analysis section 16 determines the illumination characteristic shift amount Lo based on a result of analyzing the dark portion of the color image has been heretofore described, the invention is not limited thereto. In general, the illumination characteristic shift amount Lo may be determined based on a result of analyzing a dark portion resulting from the color image. As an example, as shown in FIG. 14, the dark portion characteristic analysis section 16 may determine the illumination characteristic shift amount Lo based on a result of analyzing the dark portions of the luminance image and the chromaticity image generated by the color conversion section 11. In this case, $\sigma^2_V$, $\sigma^2_H$, and $\sigma^2_S$ are found using the values of luminance V and chromaticity HS as follows.

$$\sigma^2_V = \frac{1}{N}\sum_i (V_i - \overline{V})^2 \qquad \text{(Expression 10)}$$

$$\sigma^2_H = \frac{1}{N}\sum_i (H_i - \overline{H})^2 \qquad \text{(Expression 11)}$$

$$\sigma^2_S = \frac{1}{N}\sum_i (S_i - \overline{S})^2 \qquad \text{(Expression 12)}$$

Then, these values may be combined as in the example of RGB of Expression 9 and may be associated with Lo. Specifically, the average value $\sigma^2_{HSV}$ of $\sigma^2_V$, $\sigma^2_H$ and $\sigma^2_S$ should be found and $\sigma^2_{HSV}$ should be associated with Lo like the average value $\sigma^2_{RGB}$ of Expression 9. Alternatively, the weighted average value of $\sigma^2_V$, $\sigma^2_H$, $\sigma^2_S$ may be $\sigma^2_{HSV}$, or one of $\sigma^2_V$, $\sigma^2_H$, and $\sigma^2_S$ may be $\sigma^2_{HSV}$. In this exemplary embodiment, the dark portion characteristic analysis section 16 associates the degree of variation of pixels of the dark portion and the shift amount, and thus any may be used insofar as the meaning is not damaged.

In the second exemplary embodiment, although the dark portion characteristic analysis section 16 finds the degree of variation of the pixel value in the dark portion as the characteristic of the dark portion, and the illumination characteristic shift amount Lo is determined according to the degree of variation, the invention is not limited thereto. For example, the illumination characteristic shift amount Lo may be determined according to other characteristics, such as the degree of variation in saturation in the dark portion.

In this exemplary embodiment, the dark portion characteristic analysis section 16 is provided as an example of a change degree information generation unit that generates change degree information.

Third Exemplary Embodiment

A third exemplary embodiment has the same problem to be addressed as in the first exemplary embodiment and the second exemplary embodiment, and is to suppress increase of dark portion noise. In the first exemplary embodiment and the second exemplary embodiment, although processing for securing calculation stability for the characteristic of the illumination component is performed, in the third exemplary embodiment, processing for changing the characteristic such that subsequent calculation of a reflectance component may be stably performed is performed for the color image to be the original image.

Figure 15:
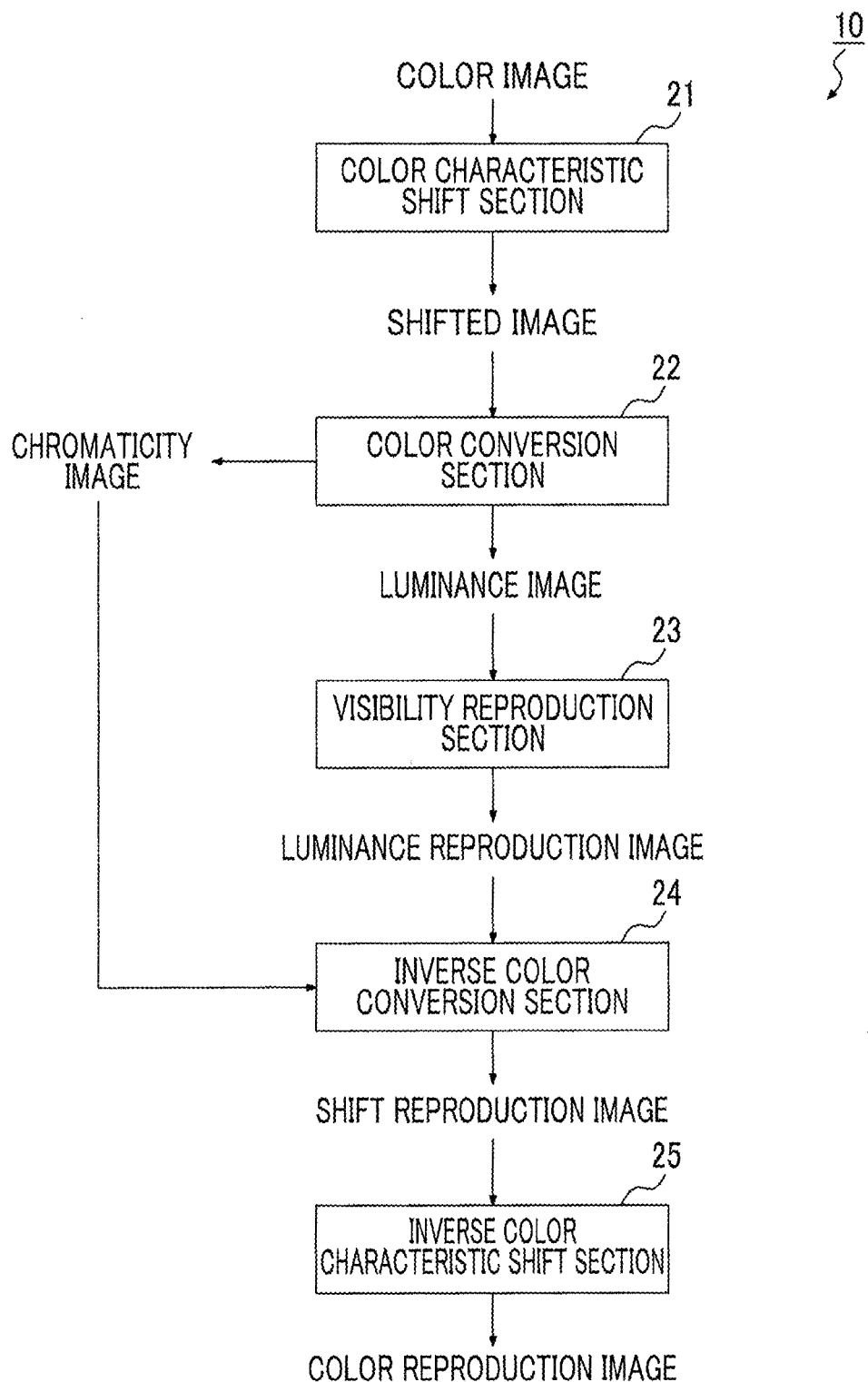
FIG. 15 is a block diagram showing a functional configuration example of an image processing apparatus in a third exemplary embodiment of the invention.

FIG. 15 is a block diagram showing a functional configuration example of the image processing apparatus 10 in a third exemplary embodiment of the invention. As shown in the drawing, the image processing apparatus 10 in the third exemplary embodiment includes a color characteristic shift section 21, a color conversion section 22, a visibility reproduction section 23, an inverse color conversion section 24, and an inverse color characteristic shift section 25. Here, in the color conversion section 22, the color image in the color conversion section 11 of the first exemplary embodiment and the second exemplary embodiment is only substituted with a shifted image described below, and in the inverse color conversion section 24, the color reproduction image in the inverse color conversion section 15 of the first exemplary embodiment and the second exemplary embodiment is only substituted with a shift reproduction image described below. Accordingly, detailed description thereof will not be repeated, and hereinafter, only the color characteristic shift section 21, the visibility reproduction section 23, and the inverse color characteristic shift section 25 will be described.

Figure 16:
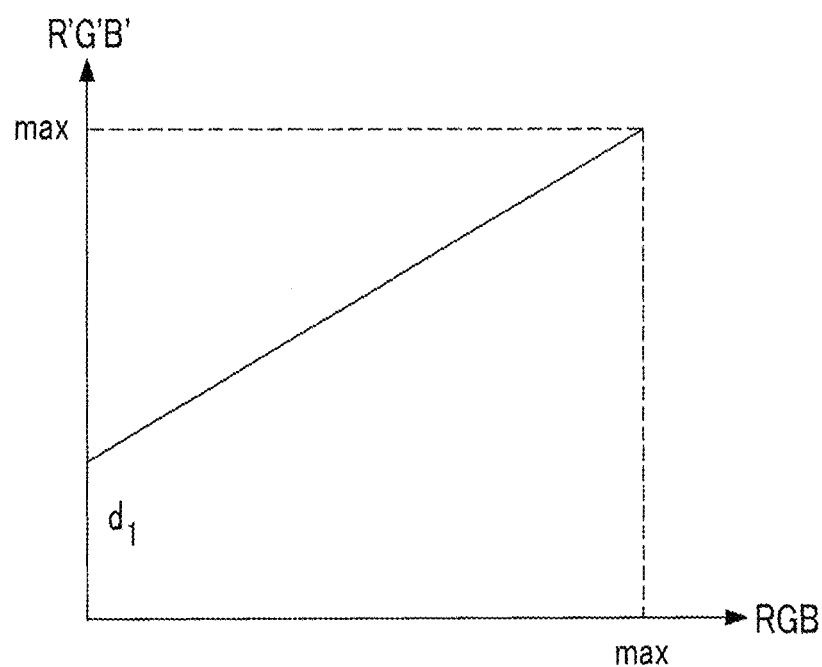
FIG. 16 is a diagram showing an example of a function for converting color components RGB of an original image to color components R'G'B' of a shifted image.

The color characteristic shift section 21 performs shift to reduce the color gamut of the color space for the color component of the color image using a color characteristic shift amount $d_1$. FIG. 16 shows the association of RGB and R'G'B' when color components of an original image are RGB and color components of a shifted image after the shift is performed are R'G'B'. The range of each of RGB and R'G'B' should be 0 to 255, and max should be 255. FIG. 16 is as follows in the form of an expression.

$$R' = \frac{255 - d_1}{255}R + d_1 \qquad \text{(Expression 13)}$$

$$G' = \frac{255 - d_1}{255}G + d_1 \qquad \text{(Expression 14)}$$

$$B' = \frac{255 - d_1}{255}B + d_1 \qquad \text{(Expression 15)}$$

Figure 17:
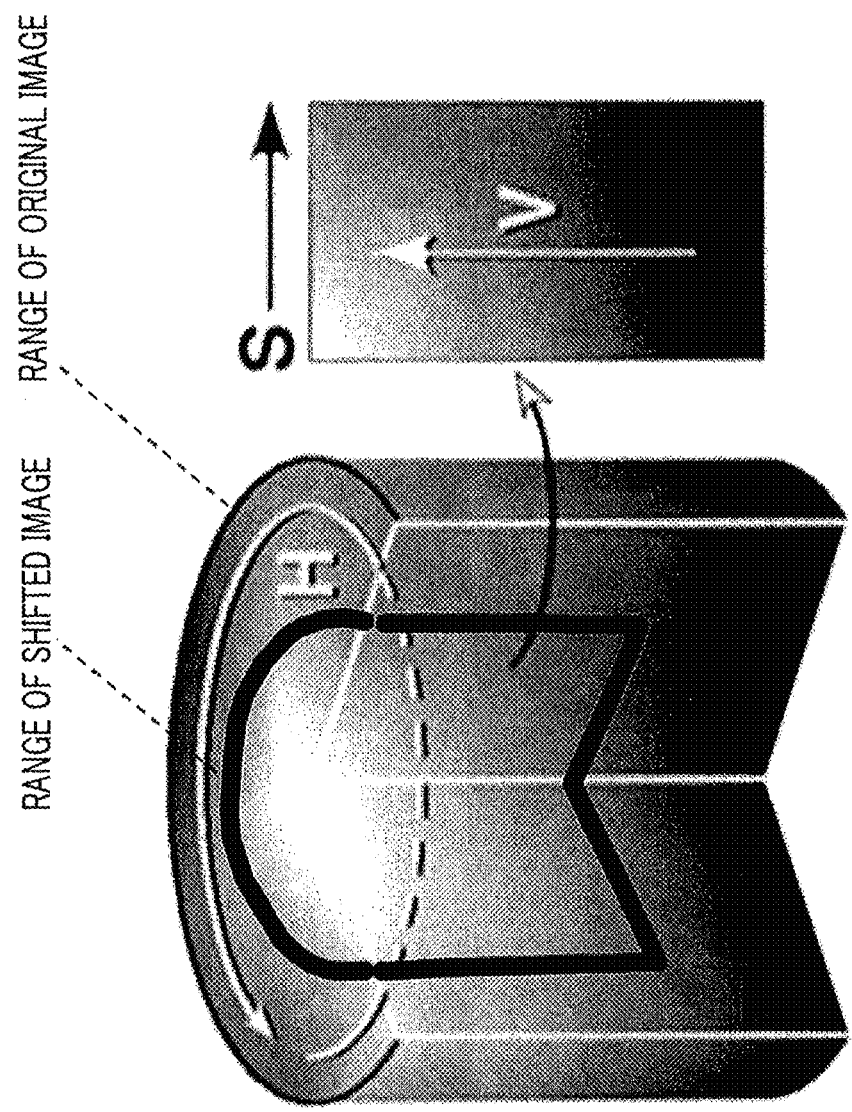
FIG. 17 is a diagram showing the range of a color gamut of an original image and the range of a color gamut of a shifted image in an HSV color space.

With this, while gradation of an original color image is maintained, calculation of subsequent visibility reproduction is performed in a state where there is no dark portion region. It is understood that the range of the color gamut of the shifted image becomes, for example, a range indicated by a bold line in FIG. 17 through the conversion of FIG. 16, and is reduced to a high brightness side from the range of the color gamut of the original image. FIG. 17 is a diagram showing a color gamut in an HSV image.

In this exemplary embodiment, the shifted image is used as an example of a changed image, and the color characteristic shift section 21 is provided as an example of a changed image generation unit that generates a changed image.

The visibility reproduction section 23 performs image processing for improving visibility on the luminance image generated by the color conversion section 22 to generate a luminance reproduction image.

In this exemplary embodiment, the visibility reproduction section 23 is provided as an example of a luminance reproduction image generation unit that generates a luminance reproduction image.

Figure 18:
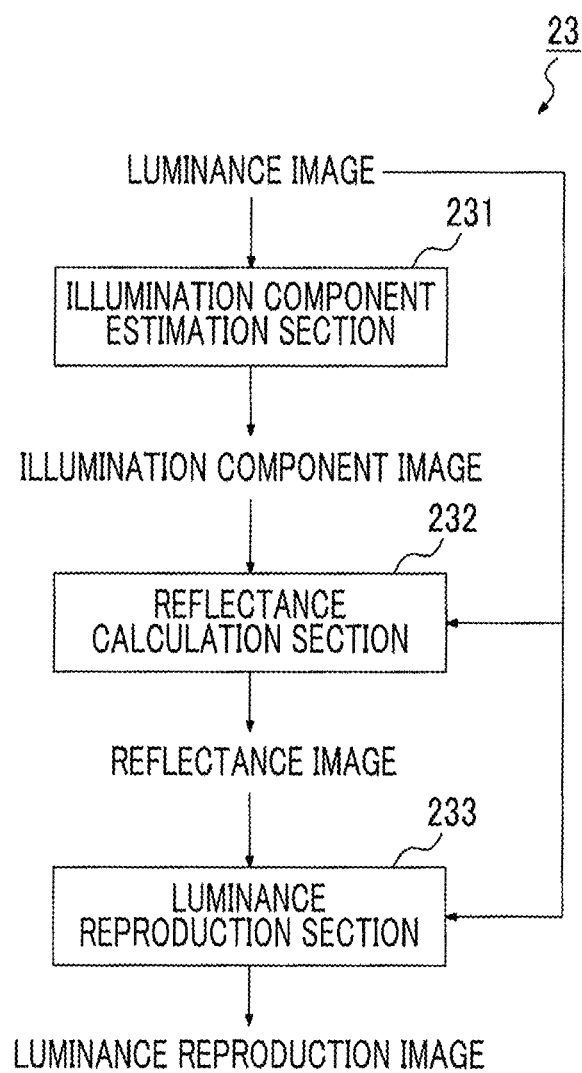
FIG. 18 is a block diagram showing a functional configuration example of a visibility reproduction section of the image processing apparatus in the third exemplary embodiment of the invention.

FIG. 18 is a block diagram showing a functional configuration example of the visibility reproduction section 23. An illumination component estimation section 231 may be the same as the illumination component estimation section 12 in the first exemplary embodiment. A reflectance calculation unit 232 may execute the calculation of Expression 4, and a luminance reproduction section 233 should execute the calculation of Expression 6.

Figure 19:
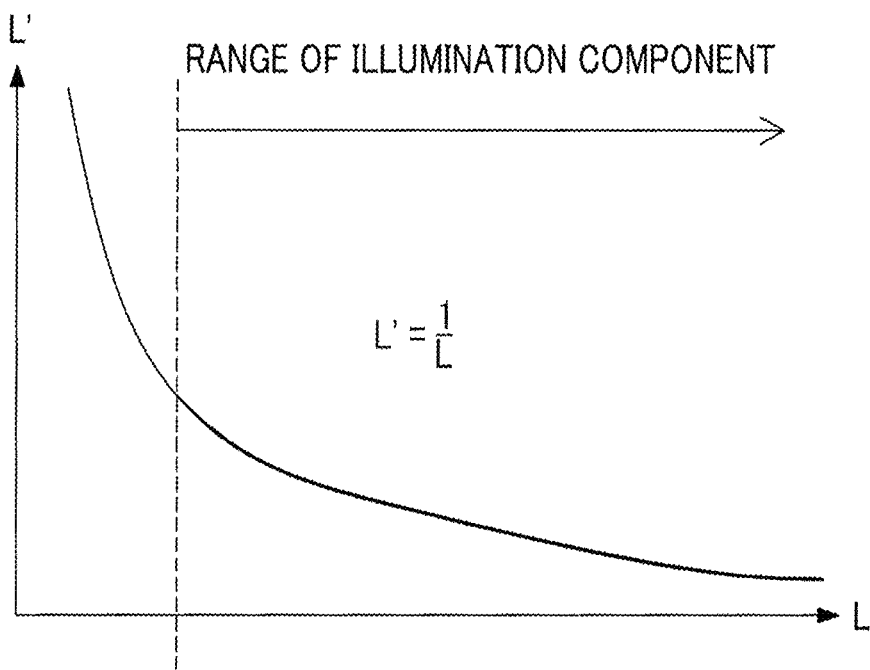
FIG. 19 is a diagram showing the range of $L(x,y)$ that is used in the third exemplary embodiment of the invention.

In this way, although the reflectance calculation unit 232 executes the calculation of Expression 4, in this exemplary embodiment, the conversion of FIG. 16 is performed, and thus the range of L(x,y) that is used in the reflectance calculation unit 232 becomes the range that is represented as "range of illumination component" in FIG. 19. With this, only the value of L' corresponding to L in the "range of illumination component" among the possible values of L' to be "L'=1/L" of FIG. 19, contributes to reflectance. Accordingly, in a sense of securing stability, as in the first exemplary embodiment, a similar effect to a case where the illumination component is shifted is obtained.

The inverse color conversion section 24 performs color conversion from an HSV color space to an RGB color space on the obtained luminance reproduction image (V image) and the chromaticity image (HS image) obtained by the color conversion section 22 to generate a shift reproduction image. At this time, the range of the color gamut of the shift reproduction image remains the range of the color gamut of the shifted image shown in FIG. 17.

Figure 20:
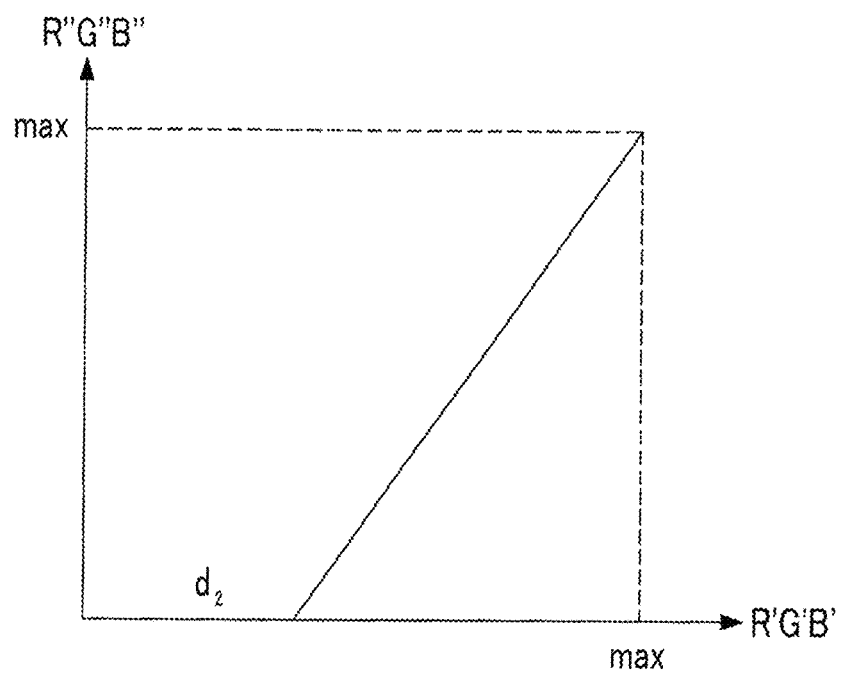
FIG. 20 is a diagram showing an example of a function for converting color components R'G'B' of a shift reproduction image to color components R"G"B" of a color reproduction image.

Accordingly, the inverse color characteristic shift section 25 performs inverse shift shown in FIG. 20 on the color components of the shift reproduction image using an inverse color characteristic shift amount $d_2$.

A line represented by FIG. 20 should be as follows in a range of $0 \leq RGB < d_2$.

$$R''=G''=B''=0 \quad \text{(Expression 16)}$$

The following expressions should be established in a range of $d_2 \leq RGB \leq 255$.

$$R'' = \frac{255}{255-d_2}R' - \frac{255 d_2}{255-d_2} \quad \text{(Expression 17)}$$

$$G'' = \frac{255}{255-d_2}G' - \frac{255 d_2}{255-d_2} \quad \text{(Expression 18)}$$

$$B'' = \frac{255}{255-d_2}B' - \frac{255 d_2}{255-d_2} \quad \text{(Expression 19)}$$

In these expressions, the range of the color gamut is expanded to a low brightness side, that is, toward the range of the color gamut of the original image in FIG. 17. With this, visibility is increased, and a color reproduction image in which noise is suppressed by reflectance securing calculation stability is obtained.

In this exemplary embodiment, the shift reproduction image is used as an example of an inversely converted image, the color reproduction image is used as an example of a reproduction image, and the inverse color characteristic shift section 25 is provided as an example of a reproduction image generation unit that changes the inversely converted image to expand the reproduction range of the inversely converted image to generate a reproduction image.

Figure 21:
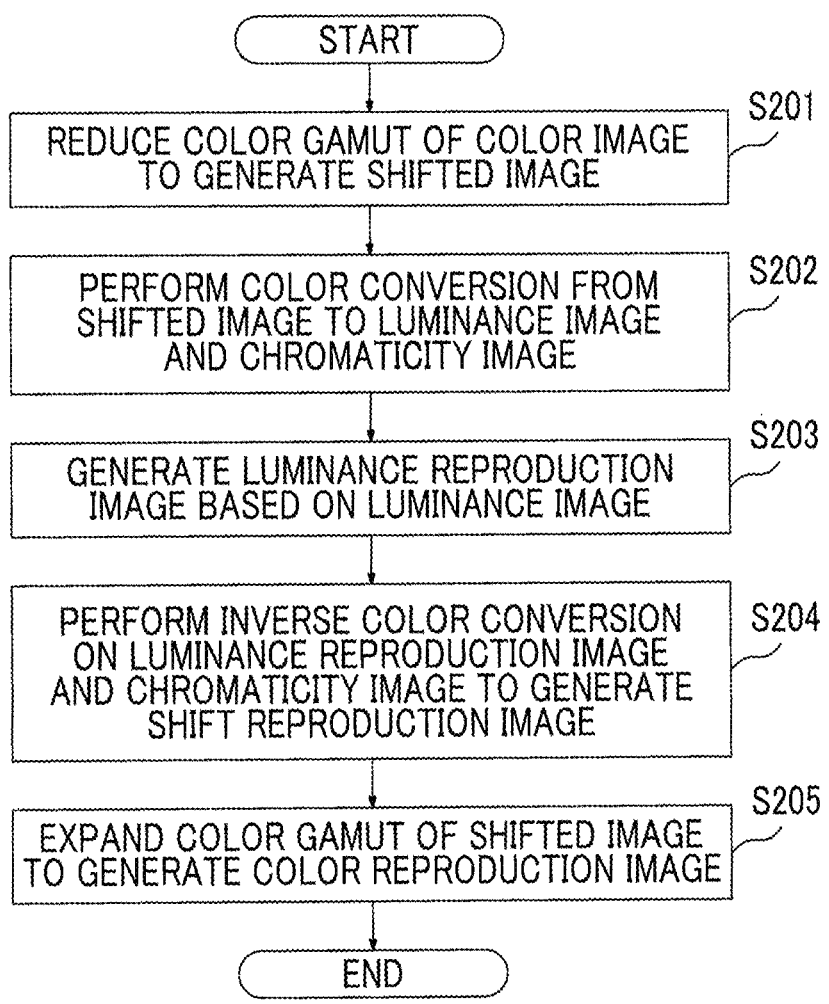
FIG. 21 is a flowchart showing an operation example of the image processing apparatus in the third exemplary embodiment of the invention.

FIG. 21 is a flowchart showing an operation example of the image processing apparatus 10 in the third exemplary embodiment of the invention.

If a color image is input, first, the color characteristic shift section 21 performs the conversion of FIG. 16 on the color image, thereby generating a shifted image (Step 201).

Then, the color conversion section 22 performs color conversion on the shifted image from the color space of the shifted image to the color space of luminance and chromaticity to generate a luminance image and a chromaticity image (Step 202).

Next, the visibility reproduction section 23 generates a luminance reproduction image based on the luminance image generated in Step 202 by Expressions 3, 4, and 6 (Step 203).

Thereafter, the inverse color conversion section 24 performs color conversion inverse to the color conversion performed by the color conversion section 22, that is, color conversion from the color space of luminance and chromaticity to the color space of the shifted image, on the luminance reproduction image generated in Step 203 and the chromaticity image generated in Step 202 to generate a shift reproduction image (Step 204).

Finally, the inverse color characteristic shift section 25 performs the conversion of FIG. 20 on the shift reproduction image generated in Step 204 to generate a color reproduction image (Step 205).

Fourth Exemplary Embodiment

Figure 22:
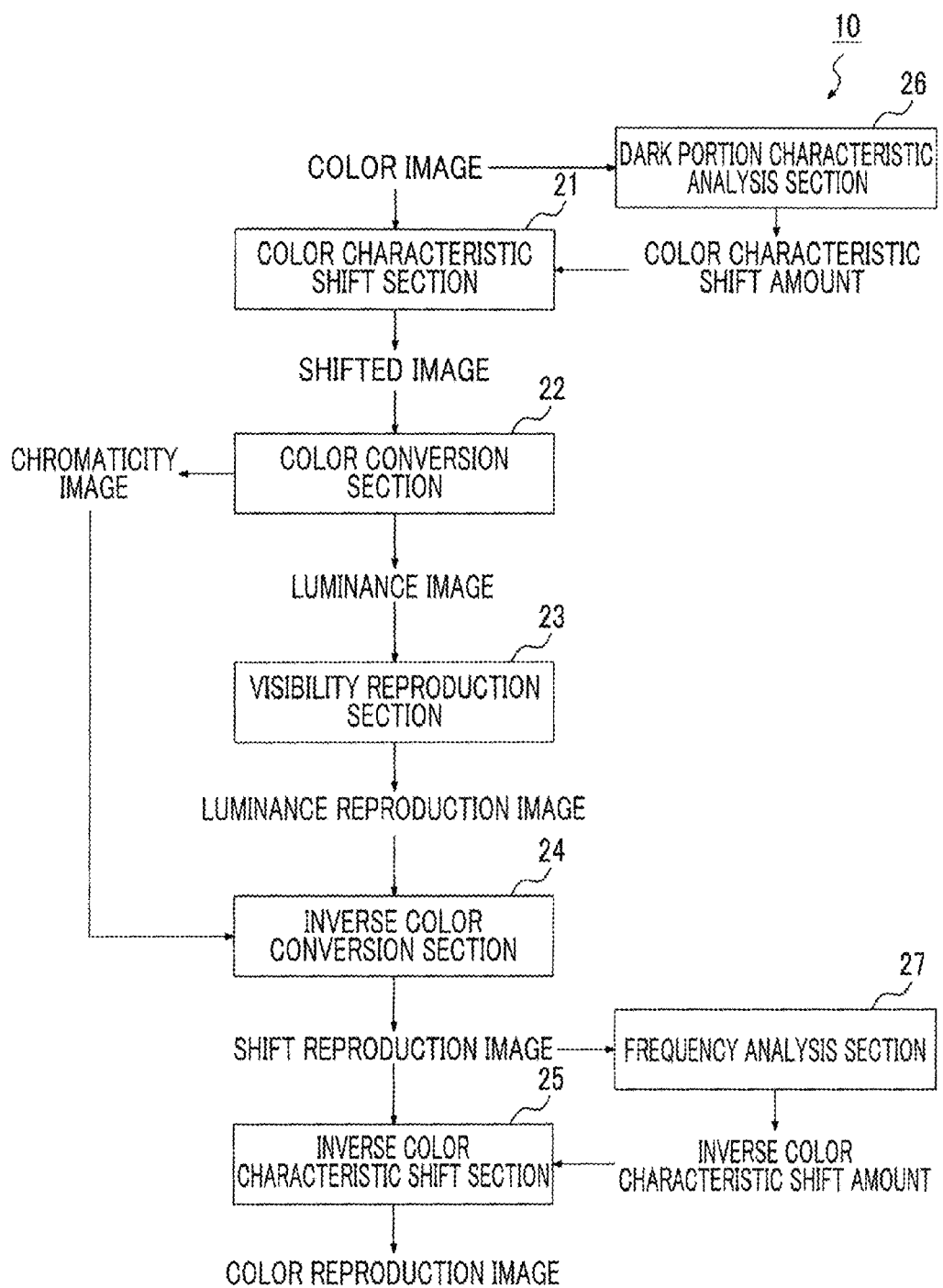
FIG. 22 is a block diagram showing a functional configuration example of an image processing apparatus in a fourth exemplary embodiment of the invention.

FIG. 22 is a block diagram showing a functional configuration example of the image processing apparatus 10 in a fourth exemplary embodiment of the invention. As shown in the drawing, the image processing apparatus 10 in the fourth exemplary embodiment includes the color characteristic shift section 21, the color conversion section 22, the visibility reproduction section 23, the inverse color conversion section 24, the inverse color characteristic shift section 25, a dark portion characteristic analysis section 26, and a frequency analysis section 27. Here, the color characteristic shift section 21, the color conversion section 22, the visibility reproduction section 23, the inverse color conversion section 24, and the inverse color characteristic shift section 25 are the same as those in the third exemplary embodiment, and thus description thereof will not be repeated. Hereinafter, only the dark portion characteristic analysis section 26 and the frequency analysis section 27 will be described.

Figure 23:
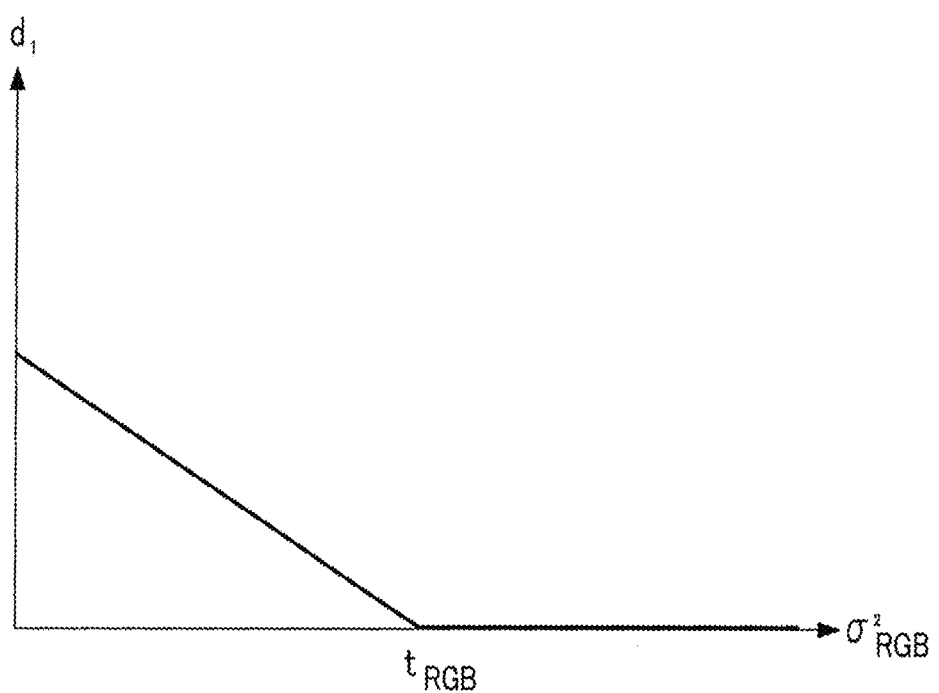
FIG. 23 is a diagram showing an example of a function in which an average value of dispersion of RGB is associated with a color characteristic shift amount.

The dark portion characteristic analysis section 16 calculates a color characteristic shift amount $d_1$, which is used in the color characteristic shift section 21, from the dark portion characteristic of the color image. A basic concept of analysis of the dark portion characteristic is the same as the concept in the second exemplary embodiment. For example, as described in the second exemplary embodiment, a $\sigma^2_{RGB}$ is calculated by Expressions 8 and 9. If $\sigma^2_{RGB}$ is large, there is a high possibility of a texture region where visibility is desired to be increased. If $\sigma^2_{RGB}$ is small, there is a high possibility of a region where calculation stability is desired to be secured. Accordingly, for example, the color characteristic shift amount $d_1$ is found by a correspondence shown in FIG. 23. Here, as in the second exemplary embodiment, the value of $t_{RGB}$ in FIG. 23 should be determined in advance from a statistical value of a region regarded as a wall or a region to be texture.

In this exemplary embodiment, the dark portion characteristic analysis section 26 is provided as an example of a reduction degree determination unit that determines the degree of reduction of the reproduction range of the original image.

Figure 24:
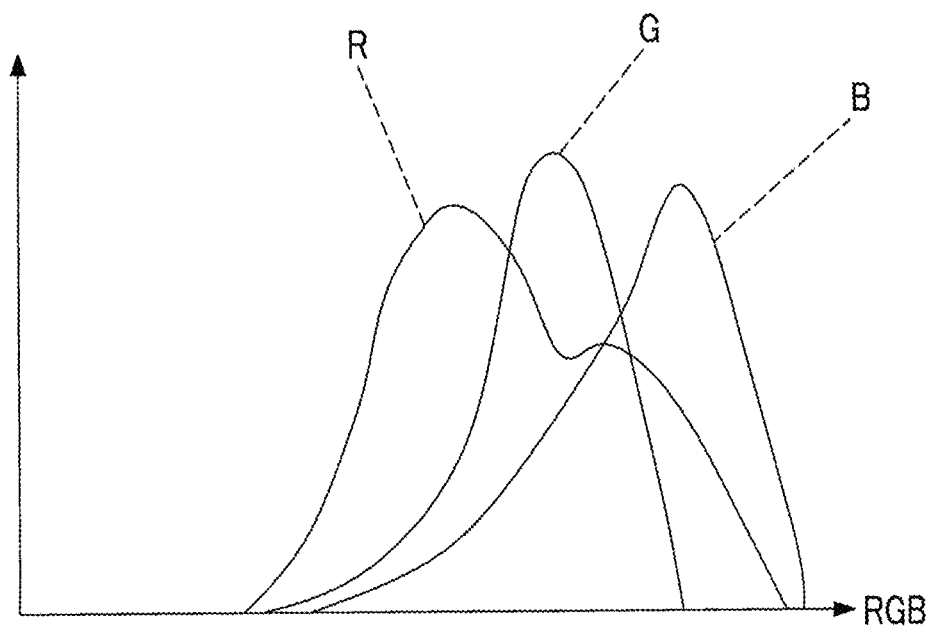
FIG. 24 is a diagram showing an example of a pixel frequency of RGB in a shift reproduction image.

The frequency analysis section 27 calculates an inverse color characteristic shift amount $d_2$, which is the amount of expansion of the range, referring to the state of the shift reproduction image whose reproduction range is the range indicated by the bold line in FIG. 17. For example, it is assumed that the pixel frequency (RGB histogram) of RGB when converted from the HSV color space to the RGB color space by the inverse color conversion section 24 is as shown in FIG. 24. In this case, for example, a minimum value minRGB among the minimum value of R, the minimum value of G, and the minimum value of B is found as follows.

$$\min RGB = \min(\min R, \min G, \min B) \quad \text{(Expression 20)}$$

Then, $d_2$ is found using minRGB as follows.

$$d_2 = \min RGB \pm \Delta d \quad \text{(Expression 21)}$$

Figure 25:
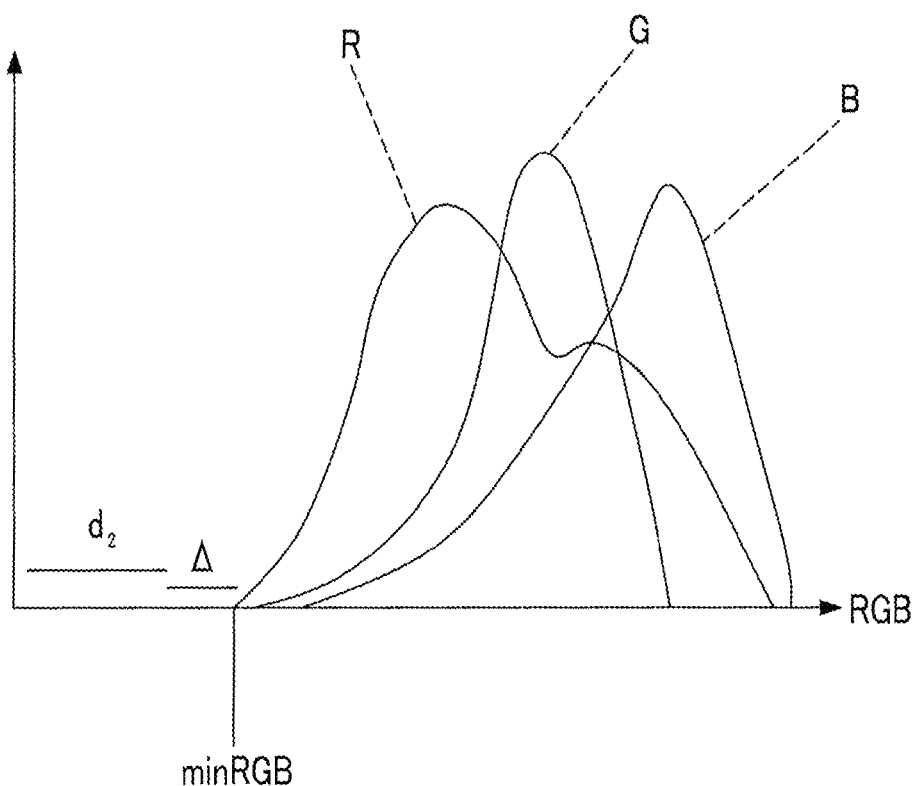
FIG. 25 is a diagram showing a calculation example of an inverse color characteristic shift amount on a pixel frequency of RGB in a shift reproduction image.

Here, $d_2$ also depends on image quality design, but may be determined based on minRGB as in Expression 21. FIG. 25 shows an example where $\Delta d$ is subtracted from minRGB to find $d_2$.

Figure 26:
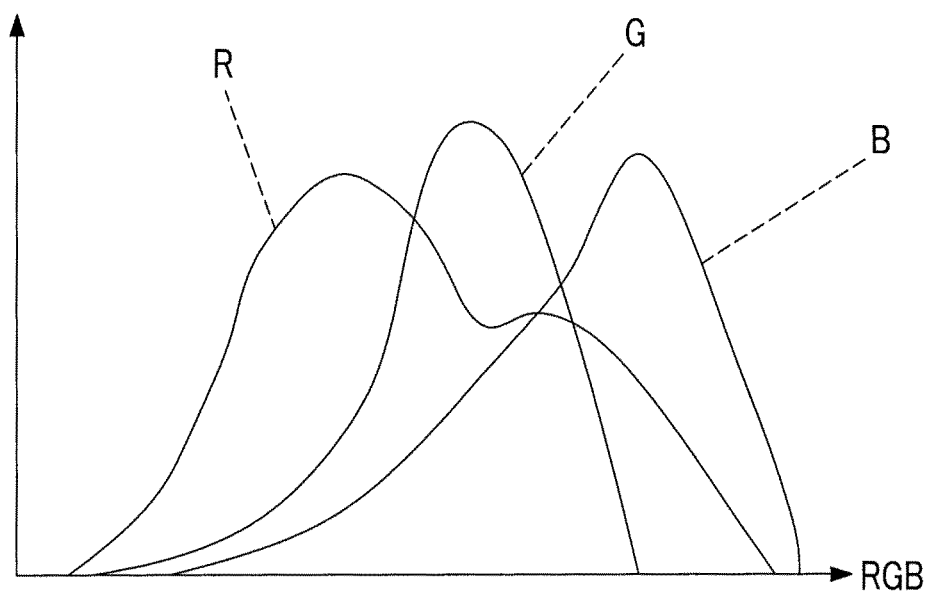
FIG. 26 is a diagram showing a pixel frequency of RGB when a reproduction range of a shift reproduction image is expanded.

If conversion is performed using the found inverse color characteristic shift amount $d_2$ as shown in FIG. 20, the pixel frequency of RGB is as shown in FIG. 26. With this, it is possible to improve visibility in the range of the color gamut of the original image and to perform visibility reproduction in which the generation of noise is suppressed.

In this exemplary embodiment, the frequency analysis section 27 is provided as an example of an expansion degree determination unit that determines the degree of expansion of the reproduction range of the inversely converted image.

Fifth Exemplary Embodiment

A fifth exemplary embodiment of the invention substitutes the visibility reproduction section 23 in the third exemplary embodiment and the fourth exemplary embodiment with the illumination component estimation section 12, the stabilized reflectance calculation section 13, and the luminance reproduction section 14 in the first exemplary embodiment or the second exemplary embodiment.

The first exemplary embodiment and the second exemplary embodiment have the same effect of calculation stability as the third exemplary embodiment and the fourth exemplary embodiment. However, while the first exemplary embodiment and the second exemplary embodiment secure calculation stability when reflectance is found from the luminance component and the illumination component, the third exemplary embodiment and the fourth exemplary embodiment perform conversion to stabilize subsequent calculation for the color components of the color image. While the effect is similar, either one configuration may be preferably used depending on a scene represented by an image. Alternatively, both configurations may be preferably used.

For example, when dark portion noise for the luminance component should be principally considered, the first exemplary embodiment and the second exemplary embodiment may be applicable, and when color noise other than luminance in dark portion noise is a problem, the third exemplary embodiment and the fourth exemplary embodiment may be applicable. When both configurations are used, this functions as any countermeasures.

[Hardware Configuration of Image Processing Apparatus]

The image processing apparatus 10 in this exemplary embodiment may be realized as, for example, image processing software installed on a PC, and is typically realized as the image processing apparatus 10 that performs image reading and image forming.

FIG. 27 is a diagram showing a hardware configuration example of the image processing apparatus 10. As shown in the drawing, the image processing apparatus 10 includes a central processing unit (CPU) 31, a random access memory (RAM) 32, a read only memory (ROM) 33, a hard disk drive (HDD) 34, an operation panel 35, an image reading section 36, an image forming section 37, and a communication interface (hereinafter, referred to as "communication I/F") 38.

The CPU 31 loads and executes various programs stored in the ROM 33 or the like on the RAM 32, thereby realizing respective functions described below.

The RAM 32 is a memory that is used as a work memory of the CPU 31, or the like.

The ROM 33 is a memory that stores various programs executed by the CPU 31, or the like.

The HDD 34 is, for example, a magnetic disk device that stores image data read by the image reading section 36, image data used for image forming in the image forming section 37, or the like.

The operation panel 35 is a touch panel that displays various kinds of information or receives an operation input from a user. Here, the operation panel 35 has a display on which various kinds of information are displayed, and a position detection sheet that detects a position indicated by a finger, a stylus pen, or the like.

The image reading section 36 reads an image recorded on a recording medium, such as paper. Here, the image reading section 36 is, for example, a scanner, and a CCD system in which reflected light of light irradiated onto a document from a light source is reduced by a lens and received by a charge coupled devices (CCD), or a CIS system in which reflected light of light sequentially irradiated onto a document from an LED light source is received by a contact image sensor (CIS) may be used.

The image forming section 37 forms an image on a recording medium. Here, the image forming section 37 is, for example, a printer, and an electrophotographic system in which toner attached to a photosensitive member is transferred to a recording medium to form an image, or an ink jet system in which ink is ejected on a recording medium to form an image may be used.

The communication I/F 38 performs transmission and reception of various kinds of information with other apparatuses through a network.

A program that realizes this exemplary embodiment may be provided by a communication unit or may be provided in a state of being stored in a recording medium, such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
 a processor connected to a memory and configured to execute:
  a color conversion unit that performs color conversion to convert an original image to a luminance image having a luminance component of the original image as a pixel value and to a chromaticity image having a chromaticity component of the original image as a pixel value;
  an illumination image generation unit that generates an illumination image having an illumination component of the luminance image as a pixel value from the luminance image;
  a reflectance image generation unit that generates a reflectance image having a reflectance component of the luminance image as a pixel value, the reflectance component of the luminance image being calculated by multiplying the luminance component of the original image and an inverse of the illumination component of the original image;
  a luminance reproduction image generation unit that enhances the reflectance component of the luminance image based on the luminance image and the reflectance image to generate a luminance reproduction image reproduced with being improved visibility of the luminance image; and an inverse color conversion unit that performs conversion inverse to the color conversion performed by the color conversion unit on the luminance reproduction image and the chromaticity image, wherein the reflectance image generation unit also includes a stabilized reflectance calculation section that calculates a stabilized reflectance component of the original image, by correcting the reflectance component of the luminance image.

2. The image processing apparatus according to claim 1, wherein the reflectance image generation unit calculates the stabilized reflectance component of the luminance image based on the pixel value of the luminance image and a reciprocal of a pixel value obtained by increasing the pixel value of the illumination image according to a degree represented by the change degree information.

3. The image processing apparatus according to claim 2, further comprising:

a change degree information generation unit that generates the change degree information based on a characteristic of a dark portion region resulting from the original image.

4. The image processing apparatus according to claim 3, wherein the change degree information generation unit uses a degree of variation of the pixel value in the dark portion region as the characteristic of the dark portion region resulting from the original image.

5. The image processing apparatus according to claim 1, further comprising:

a change degree information generation unit that generates the change degree information based on a characteristic of a dark portion region resulting from the original image.

6. The image processing apparatus according to claim 5, wherein the change degree information generation unit uses a degree of variation of the pixel value in the dark portion region as the characteristic of the dark portion region resulting from the original image.

7. An image processing apparatus comprising:

a processor connected to a memory and configured to execute:

a changed image generation unit that changes an original image to be reduced in a reproduction range of the original image to generate a changed image;

a color conversion unit that performs color conversion to convert the changed image to a luminance image having a luminance component of the changed image as a pixel value and a chromaticity image having a chromaticity component of the changed image as a pixel value;

a luminance reproduction image generation unit that enhances a reflectance component of the luminance image to generate a luminance reproduction image reproduced with being improved visibility of the luminance image, the reflectance component of the luminance image being calculated by multiplying the luminance component of the changed image and an inverse of an illumination component of the changed image;

an inverse color conversion unit that performs conversion inverse to the color conversion performed by the color conversion unit on the luminance reproduction image and the chromaticity image; and a reproduction image generation unit that changes an inversely converted image obtained by the inverse conversion in the inverse color conversion unit to expand the reproduction range of the inversely converted image to generate a reproduction image; and a stabilized reflectance calculation unit that calculates a stabilized reflectance component of the changed image, by correcting the reflectance component of the luminance image.

8. The image processing apparatus according to claim 7, wherein the changed image generation unit reduces the reproduction range of the original image to a high brightness side, and the luminance reproduction image generation unit calculates a stabilized reflectance component of the luminance image based on a pixel value of the luminance image and a reciprocal of a pixel value representing an illumination component of the luminance image.

9. The image processing apparatus according to claim 8, wherein the reproduction image generation unit expands the reproduction range of the inversely converted image to a low brightness side.

10. The image processing apparatus according to claim 9, further comprising:

a reduction degree determination unit that determines a degree of reduction of the reproduction range of the original image in the changed image generation unit based on a characteristic of a dark portion region of the original image.

11. The image processing apparatus according to claim 8, further comprising:

a reduction degree determination unit that determines a degree of reduction of the reproduction range of the original image in the changed image generation unit based on a characteristic of a dark portion region of the original image.

12. The image processing apparatus according to claim 11, wherein the reduction degree determination unit uses a degree of variation of the pixel value in the dark portion region as the characteristic of the dark portion region of the original image.

13. The image processing apparatus according to claim 7, wherein the reproduction image generation unit expands the reproduction range of the inversely converted image to a low brightness side.

14. The image processing apparatus according to claim 13, further comprising:

a reduction degree determination unit that determines a degree of reduction of the reproduction range of the original image in the changed image generation unit based on a characteristic of a dark portion region of the original image.

15. The image processing apparatus according to claim 14, wherein the reduction degree determination unit uses a degree of variation of the pixel value in the dark portion region as the characteristic of the dark portion region of the original image.

16. The image processing apparatus according to claim 7, further comprising:

a reduction degree determination unit that determines a degree of reduction of the reproduction range of the original image in the changed image generation unit based on a characteristic of a dark portion region of the original image.

17. The image processing apparatus according to claim 16, wherein the reduction degree determination unit uses a degree of variation of the pixel value in the dark portion region as the characteristic of the dark portion region of the original image.

18. The image processing apparatus according to claim 7, further comprising:
an expansion degree determination unit that determines a degree of expansion of the reproduction range of the inversely converted image in the reproduction image generation unit based on an appearance frequency of a pixel value in the inversely converted image.

19. A non-transitory computer readable medium storing a program causing a computer to realize:
a function of performing color conversion to convert an original image to a luminance image having a luminance component of the original image as a pixel value and a chromaticity image having a chromaticity component of the original image as a pixel value;
a function of generating an illumination image having an illumination component of the luminance image as a pixel value from the luminance image;
a function of generating a reflectance image having a reflectance component of the luminance image as a pixel value, the reflectance component of the luminance image being calculated by multiplying the luminance component of the original image and an inverse of the illumination component of the original image;
a function of enhancing the reflectance component of the luminance image based on the luminance image and the reflectance image to generate a luminance reproduction image reproduced with being improved visibility of the luminance image; and
a function of performing conversion inverse to the color conversion on the luminance reproduction image and the chromaticity image,
wherein the function of generating the reflectance image also includes calculating a stabilized reflectance component of the original image, by correcting the reflectance component of the luminance image.

* * * * *